US008814682B2

(12) United States Patent
Yamashita et al.

(10) Patent No.: US 8,814,682 B2
(45) Date of Patent: Aug. 26, 2014

(54) GAME SYSTEM, GAME DEVICE, STORAGE MEDIUM HAVING GAME PROGRAM STORED THEREON, AND GAME PROCESS METHOD

(71) Applicant: Nintendo Co., Ltd., Kyoto (JP)

(72) Inventors: Yoshikazu Yamashita, Kyoto (JP); Yuichiro Okamura, Kyoto (JP); Takayuki Shimamura, Kyoto (JP); Souichi Nakajima, Kyoto (JP)

(73) Assignee: Nintendo Co. Ltd., Kyoto (JP)

( * ) Notice: Subject to any disclaimer, the term of this patent is extended or adjusted under 35 U.S.C. 154(b) by 0 days.

(21) Appl. No.: 13/661,731

(22) Filed: Oct. 26, 2012

(65) Prior Publication Data
US 2013/0109473 A1 May 2, 2013

(30) Foreign Application Priority Data

Oct. 27, 2011 (JP) ................................ 2011-235596

(51) Int. Cl.
*A63F 9/24* (2006.01)
(52) U.S. Cl.
USPC ................................. 463/31; 463/30; 463/34
(58) Field of Classification Search
USPC .......................................................... 463/31
See application file for complete search history.

(56) References Cited

U.S. PATENT DOCUMENTS

| | | | | |
|---|---|---|---|---|
| 6,540,614 B1* | 4/2003 | Nishino et al. | ................... | 463/40 |
| 6,821,204 B2* | 11/2004 | Aonuma et al. | ................ | 463/32 |
| 6,923,722 B2* | 8/2005 | Yamada et al. | ................ | 463/30 |
| 6,966,837 B1* | 11/2005 | Best | ............................... | 463/33 |
| 7,326,117 B1* | 2/2008 | Best | ............................... | 463/32 |
| 2004/0229687 A1* | 11/2004 | Miyamoto et al. | .............. | 463/30 |
| 2005/0119050 A1* | 6/2005 | Suzuki | ............................ | 463/36 |
| 2005/0119053 A1* | 6/2005 | Suzuki et al. | ................... | 463/42 |
| 2009/0015679 A1* | 1/2009 | Hayakawa et al. | ........ | 348/207.1 |
| 2011/0190061 A1* | 8/2011 | Takeda et al. | ................... | 463/39 |

FOREIGN PATENT DOCUMENTS

JP       2004-159922       6/2004

* cited by examiner

*Primary Examiner* — Tramar Harper
(74) *Attorney, Agent, or Firm* — Nixon & Vanderhye PC

(57) ABSTRACT

An example game system has a terminal device and a plurality of controller devices. The game system moves a first object, which is arranged in a predetermined game space, in accordance with an operation performed on the terminal device; and moves a plurality of second objects in accordance with operations performed on the controller devices. A first virtual camera is set based on a position of the first object in the game space. A second virtual camera is set so that a plurality of the second objects are included in a visual field range. A first game image representing the game space as seen from the first virtual camera is displayed on a display unit of the terminal device. A second game image representing the game space as seen from the second virtual camera is displayed on a predetermined display device separate from the terminal device.

12 Claims, 14 Drawing Sheets

F I G. 7
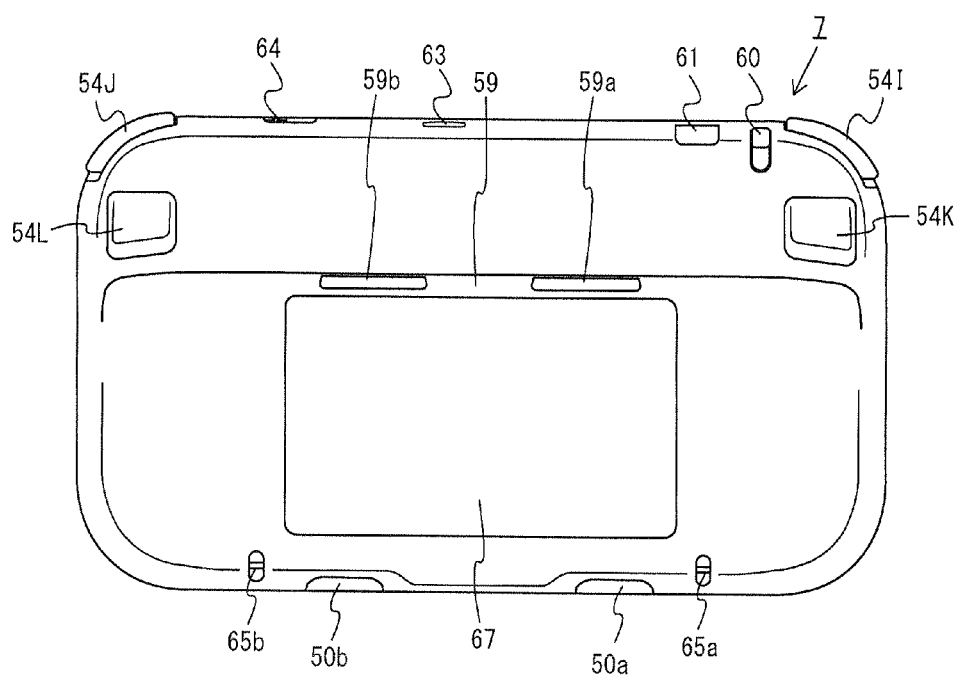

F I G. 1 1
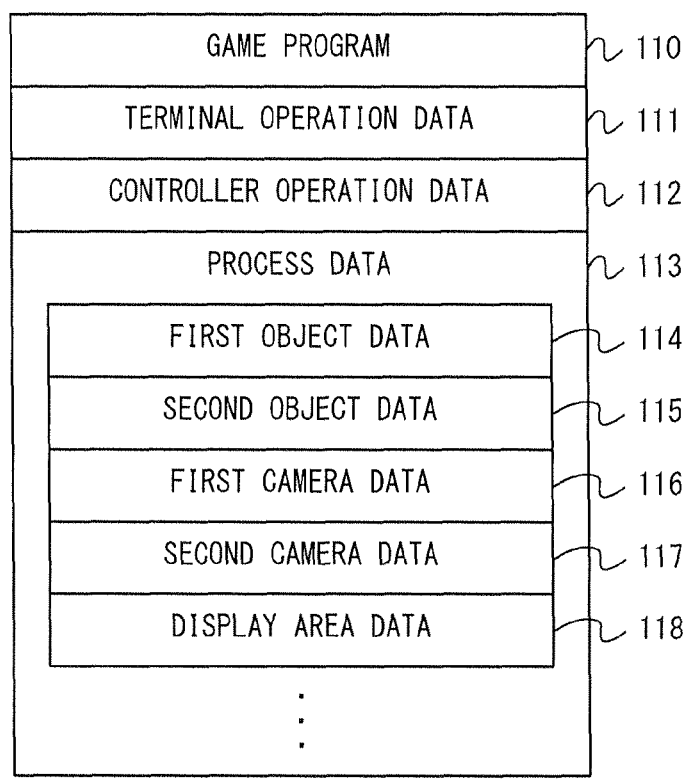

GAME SYSTEM, GAME DEVICE, STORAGE MEDIUM HAVING GAME PROGRAM STORED THEREON, AND GAME PROCESS METHOD

CROSS REFERENCE TO RELATED APPLICATION

The disclosure of Japanese Patent Application No. 2011-235596 filed on Oct. 27, 2011 is incorporated herein by reference.

FIELD

The present specification discloses a game system, a game device, a storage medium having game a program stored thereon, and a game process method for a game to be played by a plurality of players.

BACKGROUND AND SUMMARY

There are conventional game systems enabling multi-player game play in which a game is played by a plurality of players each using a game device (terminal). In such a game system, the screen area of the display device is divided into a plurality of areas, and the game image of each player (e.g., a game image including the control object of that player therein) is displayed in one of the plurality of areas. Each player plays the game while looking at an individual area in which the game image for that player is displayed.

In the conventional game system described above, where each player plays the game while looking at a different screen area, it is not possible to sufficiently feel the sense of unity, i.e., the sense of a plurality of players playing the same game together in the same game space, even though the game is being played by a plurality of people.

Therefore, the present specification discloses a game system, a game device, a game program, and a game process method, with which it is possible to feel the sense of unity, i.e., the sense of a plurality of players playing a game together, in a case where the game is played by a plurality of players.

(1)

An example game system described in the present specification has a terminal device including an operation unit and a first display unit, and a plurality of controller devices. The game system includes a first control unit, a second control unit, a first camera setting unit, a second camera setting unit, a first display control unit, and a second display control unit. The first control unit moves a first object, which is arranged in a predetermined game space, in accordance with an operation performed on the terminal device. The second control unit moves second objects second objects in the game space in accordance with operations performed on the controller devices, wherein the number of second objects arranged in the game space is determined based on the number of controller devices and each second object is associated with one of the controller devices. The first camera setting unit sets a first virtual camera based on a position of the first object in the game space. The second camera setting unit sets a second virtual camera based on positions of the second objects so that a plurality of the second objects in the game space are included in a visual field range. The first display control unit displays, on the first display unit, a first game image representing the game space as seen from the first virtual camera. The second display control unit displays, on a predetermined display device separate from the terminal device, a second game image representing the game space as seen from the second virtual camera.

With configuration (1) above, a second game image, representing a game space including second objects which are control objects of controller devices, is displayed on a predetermined display device. Thus, each second player controlling the player's second object can play the game while seeing the second object controlled by the second player as well as other second objects controlled by other second players. Therefore, the second player can play the game while feeling the sense of unity, i.e., the sense of "playing the game together with other second players". Moreover, with configuration (1) above, a player using a terminal device other than the controller devices can also play the game together.

(2)

The second camera setting unit may set the second virtual camera based on positions of the first object and the plurality of second objects so that the first object and the plurality of second objects in the game space are included in the visual field range.

With configuration (2) above, the first object, in addition to the second objects, is included in the visual field range of the second virtual camera, and displayed on the predetermined display device. Therefore, since the second players can see the first object controlled by the first player, the sense of unity in the game can also be felt between the first player and the second players, and all the players in a game system 1 can feel the sense of unity in the game.

(3)

The second camera setting unit may set the second virtual camera, wherein a predetermined size is defined as an upper limit of the visual field range of the second virtual camera. Then, the second control unit controls the second objects so as not to move out of the visual field range when the visual field range of the second virtual camera is equal to the upper limit. The first control unit moves the first object in accordance with an operation performed on the terminal device, independently of the visual field range of the second virtual camera.

With configuration (3) above, while the second objects are displayed on the predetermined display device, the first object may disappear from the predetermined display device. Herein, since the second objects are always displayed on the predetermined display device, the second players, who play the game while mainly looking at the predetermined display device, can play the game comfortably without losing sight of their own control objects. On the other hand, the first player can comfortably control the first object without feeling awkwardness because the first object will not move against the first player's intension and because even if the first object disappears from the predetermined display device, the first player can play the game while looking at the first game image displayed on the terminal device. Thus, with configuration (3) above, all the players can comfortably perform game operations, and it is possible to improve the controllability of the game.

(4)

The second camera setting unit may set an orientation of the second virtual camera so that an angle of depression thereof with respect to a predetermined plane, on which the second objects can be moved in the game space, is greater than that of the first virtual camera.

With configuration (4) above, since the second game image is a game image of the game space as seen from a relatively upward direction, it is possible to reduce the possibility that the plurality of second objects arranged on the predetermined plane are displayed lying on one another, whereby it is possible to display the second object on the predetermined display device in an easier-to-view manner. On the other hand, since the first game image is a game image of the game space as seen from a relatively horizontal direction, the first player can see the game space from a viewing direction close to the eye level of the object, and can therefore play the game while looking at a more dynamic game image. Moreover, since the first game image is an image of the game space as seen from a horizontal direction, it is easier for the first player to grasp the positional relationship with respect to the height direction. As described above, with configuration (4) above, the game images can be images that are easy-to-view for the first and second players, respectively.

(5)

The first camera setting unit may change an orientation of the first virtual camera about an axis perpendicular to the predetermined plane in accordance with an operation performed on the terminal device.

With configuration (5) above, the first player can change the viewing direction of the first game image through an operation of directing the first virtual camera in an intended direction. Therefore, even if the first game image is a game image of the game space as seen from the horizontal direction as in configuration (4) above, it is possible to easily grasp the area around the first object. Since it is not so necessary for the second players to see the first game image, the first game image can be made easier to view for the first player without causing inconvenience to the second players.

(6)

The game image representing the game space may not be displayed on the controller device.

With configuration (6) above, since no game image is displayed on the controller devices, the second players play the game while looking at the predetermined display device displaying the objects of the players. Therefore, the second players can better feel the sense of unity, i.e., the sense of "playing the game together with other second players". Moreover, with configuration (6) above, since the controller device does not need to have the function of displaying a game image, it is possible to simplify the configuration of the controller device.

(7)

The controller device may include a second display unit for displaying a sub-game image used as a supplement to the second game image.

With configuration (7) above, since a sub-game image such as a menu screen, for example, is displayed on the controller device, the second players play the game while mainly looking at the predetermined display device. Therefore, as with configuration (6) above, the second players can better feel the sense of unity, i.e., the sense of "playing the game together with other second players".

(8)

The first control unit may be capable of making the first object execute a predetermined action that imparts an effect across a predetermined range around the first object. Then, the second control unit is capable of making the second object execute an action that imparts an effect of the same kind as the predetermined action across a range around the second object that is smaller than the predetermined range.

With configuration (8) above, the first object and the second objects have different game-related capabilities from each other. Therefore, each player is required to perform game operations suitable for the capabilities of the object the player is controlling, thereby improving the strategic aspect, and it is possible to provide a game that is more entertaining.

(9)

The terminal device may further include a touch panel provided on a screen of the first display unit. Then, the first control unit controls the first object based on an input made on the touch panel. The second control unit controls the second object based on an input made on an operation button provided on the controller device.

With configuration (9) above, the first player can perform intuitive and easy game operations using the touch panel. Note that where configurations (8) and (9) above are combined with each other, the first object executes an action with a relatively wide effect range. Therefore, if this action is controlled based on an input made on the touch panel, the first player can make the first object execute the action through an easy operation. On the other hand, for the control of the second objects, if each second player is allowed to perform an operation of specifying a position on the screen of the predetermined display device, the operation will be difficult to perform since a plurality of people may then be specifying positions on a single screen at the same time. In contrast, with configuration (9) above, second players can easily control second objects without performing an operation of specifying a position on the screen of a television 2.

Note that the present specification discloses an example game device having the same functions as those of the various units of the game system of (1) to (9) above. The present specification also discloses an example storage medium having a game program stored thereon for causing a computer to function as units equivalent to the various units (excluding the image output unit) of the game device. Moreover, the present specification also discloses an example game process method to be executed by the game system described above.

With the game system, the game device, the game program and the game process method, a game image representing the game space including second objects is displayed on a predetermined display device, whereby each second player controlling one second object can play the game while looking at the second object of the second player as well as second objects being controlled by the other second players. Thus, the second player can play the game while feeling the sense of unity, i.e., the sense of "playing the game together with other second players".

These and other, features, aspects and advantages will become more apparent from the following detailed description when taken in conjunction with the accompanying drawings.

BRIEF DESCRIPTION OF THE DRAWINGS

FIG. 7 is a diagram showing an external configuration of an example non-limiting terminal device;

FIG. 11 is a diagram showing an example of data stored in a main memory of a game device 3;

DETAILED DESCRIPTION OF NON-LIMITING EXAMPLE EMBODIMENTS

[1. Overall Configuration of Game System]

An example game system of an example embodiment will now be described with reference to the drawings. In the example embodiment, the game system has a terminal device including an operation unit and a display unit, and a plurality of controller devices (a controller 5). The game system is for allowing a plurality of people to play a game by performing game operations, wherein each player uses either a terminal device or a controller device. While there are a single terminal device and a plurality of controller devices in the example embodiment, the number of terminal devices and the number of controller devices may be any number.

Figure 1:
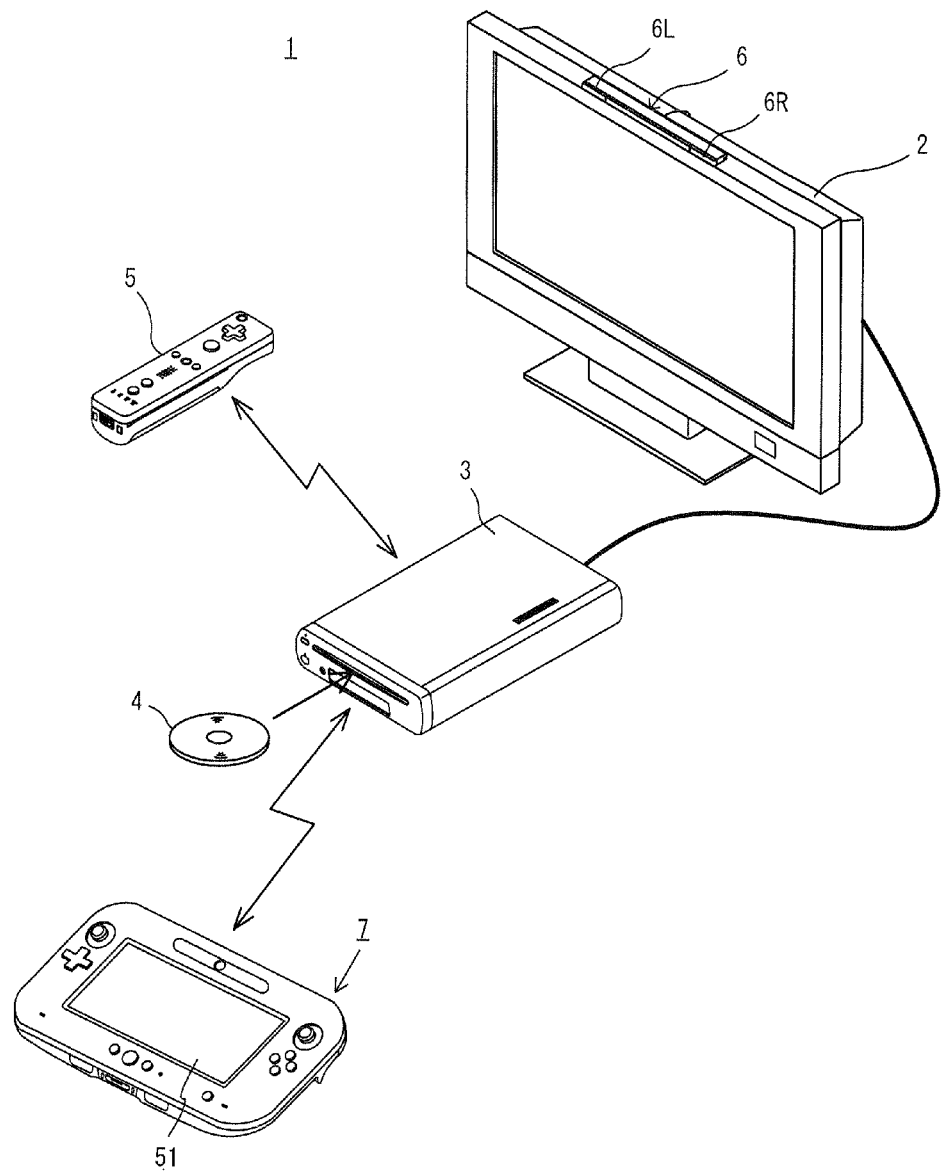
FIG. 1 is an external view of an example non-limiting game system.

FIG. 1 is an external view of the game system. In FIG. 1, a game system 1 includes a stationary display device (hereinafter referred to as a "television") 2 such as a television receiver, a stationary game device 3, an optical disc 4, a controller 5, a marker device 6, and a terminal device 7. In the game system 1, a game device 3 performs game processes based on game operations performed using the controller 5 and/or the terminal device 7, and game images obtained through the game processes are displayed on the television 2 and/or the terminal device 7.

In the game device 3, the optical disc 4 typifying an information storage medium used for the game device 3 in a replaceable manner is removably inserted. An information processing program (typically, a game program) to be executed by the game device 3 is stored in the optical disc 4. The game device 3 has, on the front surface thereof, an insertion opening for the optical disc 4. The game device 3 reads and executes the information processing program stored on the optical disc 4 which is inserted into the insertion opening, to perform the game process.

The television 2, which is an example of a predetermined display device, is connected to the game device 3 by a connecting cord. The terminal device 7 has a screen that can be viewed by the player who is holding the terminal device 7, whereas the television 2 is a display device whose screen can be viewed by any player. That is, the television 2 is a stationary display device having a larger screen than the display unit (an LCD 51) of the terminal device 7. Game images obtained as a result of the game processes performed by the game device 3 are displayed on the television 2. The television 2 includes a speaker 2a (see FIG. 2), and the speaker 2a outputs game sounds obtained as a result of the game process. In alternative example embodiments, the game device 3 and the stationary display device may be an integral unit. Also, the communication between the game device 3 and the television 2 may be wireless communication.

The marker device 6 is provided along the periphery of the screen (on the upper side of the screen in FIG. 1) of the television 2. The user (player) can perform game operations by moving the controller 5, the details of which will be described later, and the marker device 6 is used by the game device 3 for calculating the movement, position, attitude, etc., of the controller 5. The marker device 6 includes two markers 6R and 6L on opposite ends thereof. Specifically, the marker 6R (as well as the marker 6L) includes one or more infrared LEDs (Light Emitting Diodes), and emits an infrared light in a forward direction from the television 2. The marker device 6 is connected in a wired connection (or a wireless connection) to the game device 3, and the game device 3 is able to control the lighting of each infrared LED of the marker device 6. Note that the marker device 6 is of a transportable type so that the user can install the marker device 6 in any desired position. While FIG. 1 shows an example embodiment in which the marker device 6 is arranged on top of the television 2, the position and the direction of arranging the marker device 6 are not limited to this particular arrangement.

The controller 5 provides the game device 3 with operation data representing the contents of operations performed on the controller itself. The controller 5 and the game device 3 can wirelessly communicate with each other. In the present example embodiment, the wireless communication between the controller 5 and the game device 3 uses, for example, Bluetooth (Registered Trademark) technology. In other example embodiments, the controller 5 and the game device 3 may be connected by a wired connection. Furthermore, while FIG. 1 shows only one controller 5 included in the game system 1, the game system 1 includes a plurality of controllers 5. That is, the game device 3 is capable of communicating with a plurality of controllers, so that by using a predetermined number of controllers at the same time, a plurality of people can play the game. The configuration of the controller 5 will be described in detail later.

The terminal device 7 is portable and is of a size that can be held by the user. The user can hold and move the terminal device 7 or can place the terminal device 7 in any desired position. As will be described in detail later, the terminal device 7 includes a liquid crystal display (LCD) 51, and an input mechanism (e.g., a touch panel 52 and a gyrosensor 74 to be described later). The terminal device 7 can communicate with the game device 3 wirelessly (or wired). The terminal device 7 receives data for images generated by the game device 3 (e.g., game images) from the game device 3, and displays the images on the LCD 51. Note that in the present example embodiment, the LCD is used as the display of the terminal device 7, but the terminal device 7 may include any other display device, e.g., a display device utilizing electro luminescence (EL). Furthermore, the terminal device 7 transmits operation data representing the contents of operations performed thereon to the game device 3.

[2. Internal Configuration of Game Device 3]

Figure 2:
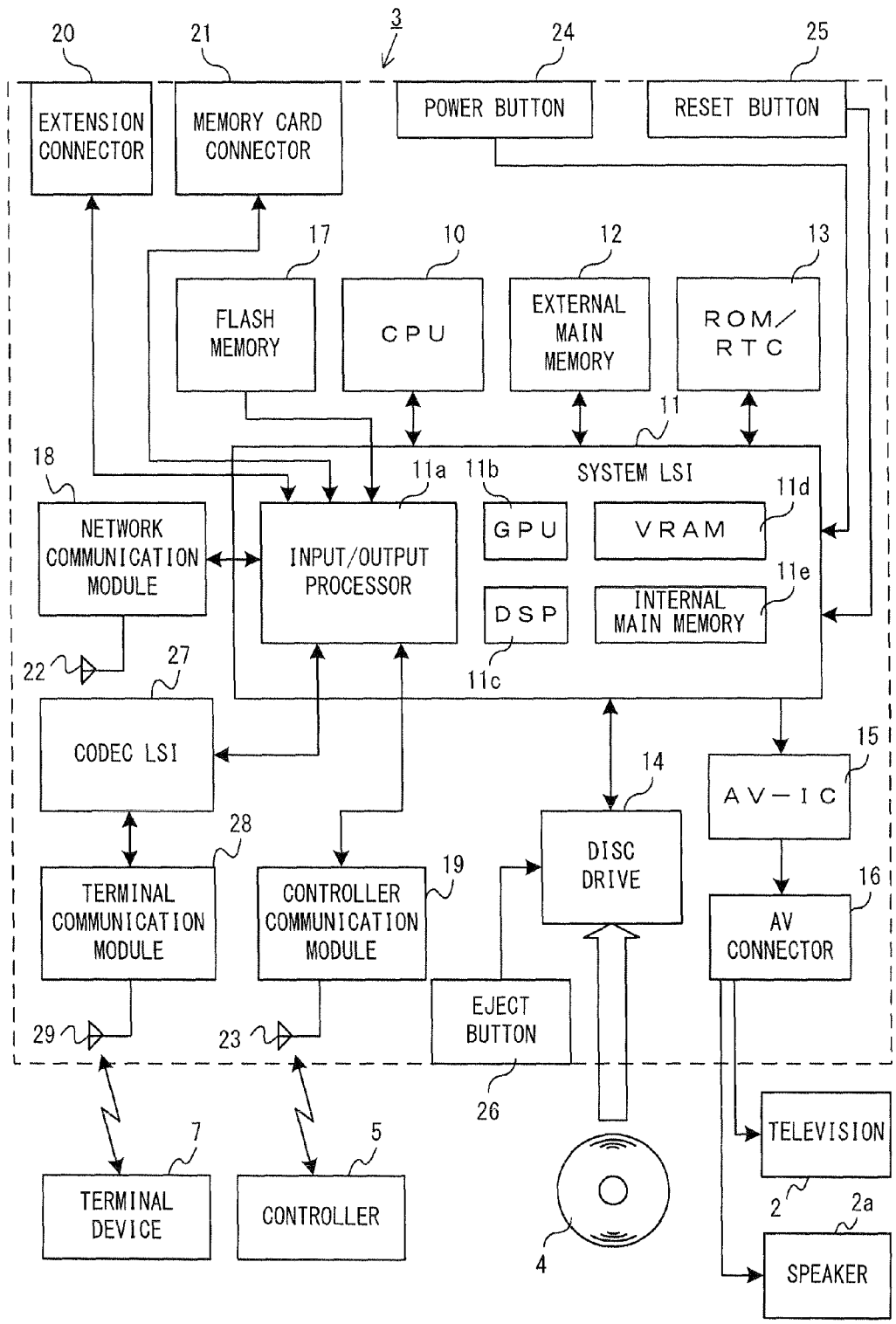
FIG. 2 is a block diagram showing an internal configuration of an example non-limiting game device.

An internal configuration of the game device 3 will be described with reference to FIG. 2. FIG. 2 is a block diagram illustrating an internal configuration of the example game device 3. The game device 3 includes a CPU (Central Processing Unit) 10, a system LSI 11, external main memory 12, a ROM/RTC 13, a disc drive 14, and an AV-IC 15.

The CPU 10 performs game processes by executing a game program stored, for example, on the optical disc 4, and functions as a game processor. The CPU 10 is connected to the system LSI 11. The external main memory 12, the ROM/RTC 13, the disc drive 14, and the AV-IC 15, as well as the CPU 10, are connected to the system LSI 11. The system LSI 11 performs processes for controlling data transmission between the respective components connected thereto, generating images to be displayed, obtaining data from an external device(s), and the like. The internal configuration of the system LSI 11 will be described below. The external main memory 12 is of a volatile type and stores a program such as a game program read from the optical disc 4, a game program read from flash memory 17, and various data. The external main memory 12 is used as a work area and a buffer area for the CPU 10. The ROM/RTC 13 includes a ROM (a so-called boot ROM) incorporating a boot program for the game device 3, and a clock circuit (RTC: Real Time Clock) for counting time. The disc drive 14 reads program data, texture data, and the like from the optical disc 4, and writes the read data into internal main memory 11e (to be described below) or the external main memory 12.

The system LSI 11 includes an input/output processor (I/O processor) 11a, a GPU (Graphics Processor Unit) 11b, a DSP (Digital Signal Processor) 11c, VRAM (Video RAM) 11d, and the internal main memory 11e. Although not shown in the figures, these components 11a to 11e are connected with each other through an internal bus.

The GPU 11b, acting as a part of a rendering unit, generates images in accordance with graphics commands (rendering commands) from the CPU 10. The VRAM 11d stores data (data such as polygon data and texture data) used by the GPU 11b to execute the graphics commands. When images are generated, the GPU 11b generates image data using data stored in the VRAM 11d. Note that in the present example embodiment, the game device 3 generates both images (game images) to be displayed on the television 2 and images (game images) to be displayed on the terminal device 7. Hereinafter, the images to be displayed on the television 2 are referred to as the "television images" and the images to be displayed on the terminal device 7 are referred to as the "terminal images".

The DSP 11c, functioning as an audio processor, generates sound data using sound data and sound waveform (e.g., tone quality) data stored in one or both of the internal main memory 11e and the external main memory 12. Note that in the present example embodiment, sounds (game sounds) to be generated are classified into two types as in the case of the game images, one being outputted by the speaker of the television 2, the other being outputted by speakers of the terminal device 7. Hereinafter, in some cases, the sounds to be outputted by the television 2 are referred to as "television sounds", and the sounds to be outputted by the terminal device 7 are referred to as "terminal sounds".

Among the images and sounds generated by the game device 3 as described above, both image data and sound data to be outputted by the television 2 are read out by the AV-IC 15. The AV-IC 15 outputs the read-out image data to the television 2 via an AV connector 16, and outputs the read-out sound data to the speaker 2a provided in the television 2. Thus, images are displayed on the television 2, and sounds are outputted by the speaker 2a. While the connection scheme between the game device 3 and the television 2 may be any scheme, the game device 3 may transmit control commands for controlling the television 2 to the television 2 via a wired connection or a wireless connection. For example, an HDMI (High-Definition Multimedia Interface) cable in conformity with the HDMI standard may be used. In the HDMI standard, it is possible to control the connected device by a function called CEC (Consumer Electronics Control). Thus, in a case in which the game device 3 can control the television 2, as when an HDMI cable is used, the game device 3 can turn ON the power of the television 2 or switch the input of the television 2 from one to another at any point in time.

Furthermore, among the images and sounds generated by the game device 3, both image data and sound data to be outputted by the terminal device 7 are transmitted to the terminal device 7 by the input/output processor 11a, etc. The data transmission to the terminal device 7 by the input/output processor 11a, etc., will be described later.

The input/output processor 11a exchanges data with components connected thereto, and downloads data from an external device(s). The input/output processor 11a is connected to the flash memory 17, a network communication module 18, a controller communication module 19, an expansion connector 20, a memory card connector 21, and a codec LSI 27. Furthermore, an antenna 22 is connected to the network communication module 18. An antenna 23 is connected to the controller communication module 19. The codec LSI 27 is connected to a terminal communication module 28, and an antenna 29 is connected to the terminal communication module 28.

The game device 3 is capable of connecting to a network such as the Internet to communicate with external information processing devices (e.g., other game devices and various servers). Specifically, the input/output processor 11a can be connected to a network such as the Internet via the network communication module 18 and the antenna 22, and can communicate with other information processing devices connected to the network. The input/output processor 11a regularly accesses the flash memory 17, and detects the presence or absence of any data to be transmitted to the network, and when detected, transmits the data to the network via the network communication module 18 and the antenna 22. Further, the input/output processor 11a receives data transmitted from the external information processing devices and data downloaded from a download server via the network, the antenna 22 and the network communication module 18, and stores the received data in the flash memory 17. The CPU 10 executes a game program so as to read data stored in the flash memory 17 and use the data, as appropriate, in the game program. The flash memory 17 may store game save data (e.g., game result data or unfinished game data) of a game played using the game device 3 in addition to data exchanged between the game device 3 and the external information processing devices. Moreover, the flash memory 17 may have a game program stored therein.

Furthermore, the game device 3 is capable of receiving operation data from the controller 5. Specifically, the input/output processor 11a receives operation data transmitted from the controller 5 via the antenna 23 and the controller communication module 19, and stores it (temporarily) in a buffer area of the internal main memory 11e or the external main memory 12.

Furthermore, the game device 3 is capable of exchanging data, for images, sound, etc., with the terminal device 7. When transmitting game images (terminal images) to the terminal device 7, the input/output processor 11a outputs game image data generated by the GPU 11b to the codec LSI 27. The codec LSI 27 performs a predetermined compression process on the image data from the input/output processor 11a. The terminal communication module 28 wirelessly communicates with the terminal device 7. Accordingly, the image data compressed by the codec LSI 27 is transmitted by the terminal communication module 28 to the terminal device 7 via the antenna 29. In the present example embodiment, the image data transmitted from the game device 3 to the terminal device 7 is image data used in a game, and the playability of a game can be adversely influenced if there is a delay in the images displayed in the game. Therefore, delay may be avoided as much as possible in transmitting image data from the game device 3 to the terminal device 7. Therefore, in the present example embodiment, the codec LSI 27 compresses image data using a compression technique with high efficiency such as the H.264 standard, for example. Other compression techniques may be used, and image data may be transmitted uncompressed if the communication speed is sufficient. The terminal communication module 28 is, for example, a Wi-Fi certified communication module, and may perform wireless communication at high speed with the terminal device 7 using a MIMO (Multiple Input Multiple Output) technique employed in the IEEE 802.11n standard, for example, or may use other communication schemes.

Furthermore, in addition to the image data, the game device 3 also transmits sound data to the terminal device 7. Specifically, the input/output processor 11a outputs sound data generated by the DSP 11c to the terminal communication module 28 via the codec LSI 27. The codec LSI 27 performs a compression process on the sound data as it does on the image data. The method for compressing the sound data may be any method. Also, in another example embodiment, the sound data may be transmitted without compression. The terminal communication module 28 transmits compressed image and sound data to the terminal device 7 via the antenna 29.

Furthermore, in addition to the image and sound data, the game device 3 transmits various control data to the terminal device 7 where appropriate. The control data is data representing an instruction to control a component included in the terminal device 7, e.g., an instruction to control lighting of a marker unit (a marker unit 55 shown in FIG. 11) or an instruction to control shooting by a camera (a camera 56 shown in FIG. 11). The input/output processor 11a transmits the control data to the terminal device 7 in accordance with an instruction from the CPU 10. Note that in the present example embodiment, the codec LSI 27 does not perform a compression process on the control data, but in another example embodiment, a compression process may be performed. Note that the data to be transmitted from the game device 3 to the terminal device 7 may or may not be coded depending on the situation.

Furthermore, the game device 3 is capable of receiving various data from the terminal device 7. As will be described in detail later, in the present example embodiment, the terminal device 7 transmits operation data, image data, and sound data. The data transmitted by the terminal device 7 is received by the terminal communication module 28 via the antenna 29. Here, the image data and the sound data from the terminal device 7 have been subjected to the same compression process as performed on the image data and the sound data from the game device 3 to the terminal device 7. Accordingly, the image data and the sound data are transferred from the terminal communication module 28 to the codec LSI 27, and subjected to a decompression process by the codec LSI 27 before output to the input/output processor 11a. On the other hand, the operation data from the terminal device 7 is smaller in size than the image data or the sound data and therefore is not always subjected to a compression process. Moreover, the operation data may or may not be coded depending on the situation. Accordingly, after being received by the terminal communication module 28, the operation data is outputted to the input/output processor 11a via the codec LSI 27. The input/output processor 11a stores the data received from the terminal device 7 (temporarily) in a buffer area of the internal main memory 11e or the external main memory 12.

Furthermore, the game device 3 can be connected to other devices or external storage media. Specifically, the input/output processor 11a is connected to the expansion connector 20 and the memory card connector 21. The expansion connector 20 is a connector for an interface, such as a USB or SCSI interface. The expansion connector 20 can receive a medium such as an external storage medium, a peripheral device such as another controller, or a wired communication connector which enables communication with a network in place of the network communication module 18. The memory card connector 21 is a connector for connecting thereto an external storage medium such as a memory card (which may be of a proprietary or standard format, such as SD, miniSD, microSD, Compact Flash, etc.). For example, the input/output processor 11a can access an external storage medium via the expansion connector 20 or the memory card connector 21 to store data in the external storage medium or read data from the external storage medium.

The game device 3 includes a power button 24, a reset button 25, and an eject button 26. The power button 24 and the reset button 25 are connected to the system LSI 11. When the power button 24 is on, power is supplied from an external power source to the components of the game device 3 via an AC adaptor (not shown). When the reset button 25 is pressed, the system LSI 11 reboots a boot program of the game device 3. The eject button 26 is connected to the disc drive 14. When the eject button 26 is pressed, the optical disc 4 is ejected from the disc drive 14.

In other example embodiments, some of the components of the game device 3 may be provided as extension devices separate from the game device 3. In this case, an extension device may be connected to the game device 3 via the expansion connector 20, for example. Specifically, an extension device may include components as described above, e.g., a codec LSI 27, a terminal communication module 28, and an antenna 29, and can be attached to/detached from the expansion connector 20. Thus, by connecting the extension device to a game device which does not include the above components, the game device can communicate with the terminal device 7.

[3. Configuration of Controller 5]

Figure 3:
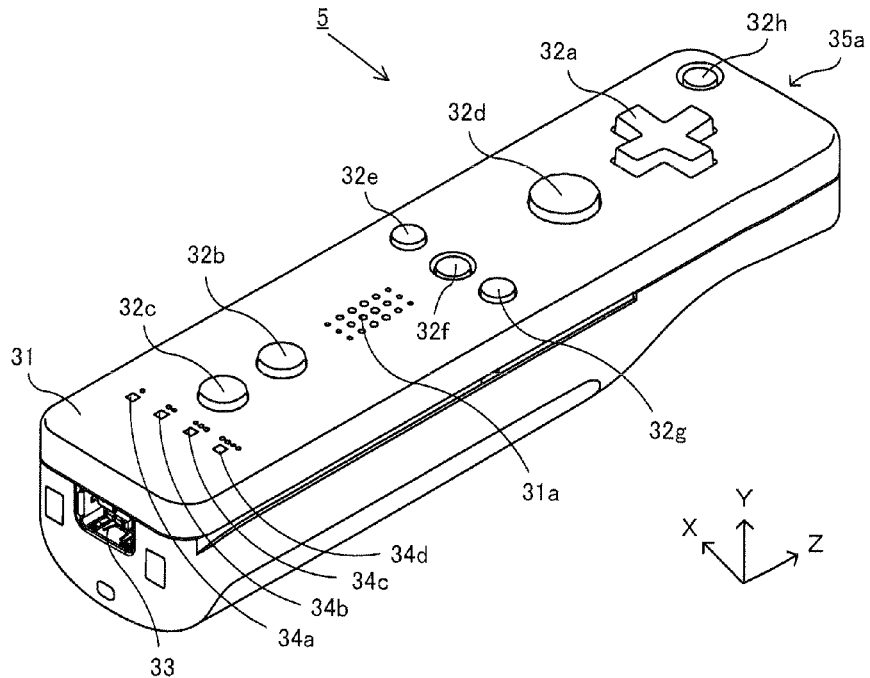
FIG. 3 is a perspective view showing an external configuration of an example non-limiting controller.
Figure 4:
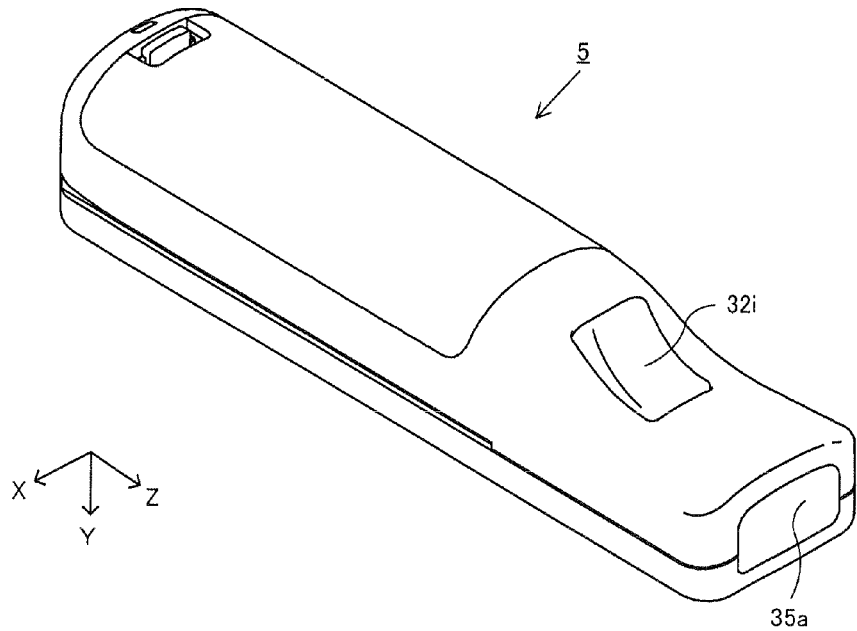
FIG. 4 is a perspective view showing an external configuration of an example non-limiting controller.

Next, with reference to FIGS. 3 to 5, the controller 5 will be described. FIG. 3 is a perspective view illustrating an external configuration of the example controller 5. FIG. 4 is a perspective view illustrating an external configuration of the controller 5. The perspective view of FIG. 3 shows the controller 5 as viewed from the top rear side thereof, and the perspective view of FIG. 4 shows the controller 5 as viewed from the bottom front side thereof. Note that the controller 5 may be any controller device capable of being controlled by the player. In the example embodiment, the controller 5 includes buttons and sensors, whereby the player can perform button operations and the operation of moving the controller device itself. While the controller 5 does not include a display unit in the example embodiment, the controller 5 may include a display unit in alternative example embodiments.

As shown in FIG. 3 and FIG. 4, the controller 5 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or even a child. The user can perform game operations by pressing buttons provided on the controller 5, and moving the controller 5 itself to change the position and the attitude (tilt) thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In the present example embodiment, the top surface of the housing 31 on which the buttons 32a to 32h are provided may be referred to as a "button surface". On the other hand, as shown in FIG. 4, a recessed portion is formed on the bottom surface of the housing 31, and a B button 32i is provided on a rear slope surface of the recessed portion. The operation buttons 32a to 32i are appropriately assigned their respective functions in accordance with the information processing program executed by the game device 3. Further, the power button 32h is intended to remotely turn ON/OFF the game device 3.

On the rear surface of the housing 31, the connector 33 is provided. The connector 33 is used for connecting the controller 5 to another device (e.g., another sensor unit or controller). Both sides of the connector 33 on the rear surface of the housing 31 have a fastening hole 33a for preventing easy inadvertent disengagement of another device as described above.

In the rear-side portion of the top surface of the housing 31, a plurality (four in FIG. 3) of LEDs 34a, 34b, 34c, and 34d are provided. The controller 5 is assigned a controller type (number) so as to be distinguishable from another controller. The LEDs 34a, 34b, 34c, and 34d are each used for informing the user of the controller type which is currently being set for the controller 5 being used, and for informing the user of remaining battery power of the controller 5, for example. Specifically, when a game operation is performed using the controller 5, one of the LEDs 34a, 34b, 34c, and 34d corresponding to the controller type is lit up.

The controller 5 has an image-capturing/processing unit 35 (FIG. 5), and a light incident surface 35a through which a light is incident on the image-capturing/processing unit 35 is provided on the front surface of the housing 31, as shown in FIG. 4. The light incident surface 35a is made of a material transmitting therethrough at least infrared light outputted by the markers 6R and 6L.

On the top surface of the housing 31, sound holes 31a for externally outputting a sound from a speaker (not shown) incorporated in the controller 5 is provided between the first button 32b and the home button 32f.

The substrate is fixed inside the housing 31, and the operation buttons 32a to 32h, the LEDs 34a, 34b, 34c, and 34d, an acceleration sensor 37, an antenna 45, a speaker, a wireless module 44, and the like are provided on the substrate. These elements are connected to a microcomputer 42 (FIG. 5) via lines (not shown) formed on the substrate and the like.

At a front edge of the substrate, the image-capturing/processing unit 35 is provided. The image-capturing/processing unit 35 includes an infrared filter 38, a lens 39, an image-capturing element 40 and an image processing circuit 41 (FIG. 5) located in order, respectively, from the front of the controller 5. These components 38 to 41 are attached on the bottom main surface of the substrate.

Moreover, the microcomputer 42 and a vibrator are provided on the substrate. The vibrator is, for example, a vibration motor or a solenoid, and is connected to the microcomputer 42 via lines formed on the substrate or the like. The controller 5 is vibrated by actuation of the vibrator based on a command from the microcomputer 42. Therefore, the vibration is conveyed to the user's hand holding the controller 5, and thus a so-called vibration-feedback game is realized.

In addition to the above, the controller 5 includes a crystal oscillator for generating the basic clock for the microcomputer 42, an amplifier for outputting sound signals to the speaker, etc.

Note that FIGS. 3 and 4 only show examples of the shapes of the controller 5, the shape of each operation button, the number and the positions of acceleration sensors and vibrators, and so on, and other shapes, numbers, and positions may be employed. Further, although in the present example embodiment, the imaging direction of the image-capturing mechanism of the controller 5 is the Z-axis positive direction, the imaging direction may be any direction. That is, the image-capturing/processing unit 35 (the light incident surface 35a through which a light is incident on the image-capturing/processing unit 35) of the controller 5 may not necessarily be provided on the front surface of the housing 31, but may be provided on any other surface on which a light can be received from the outside of the housing 31.

Figure 5:
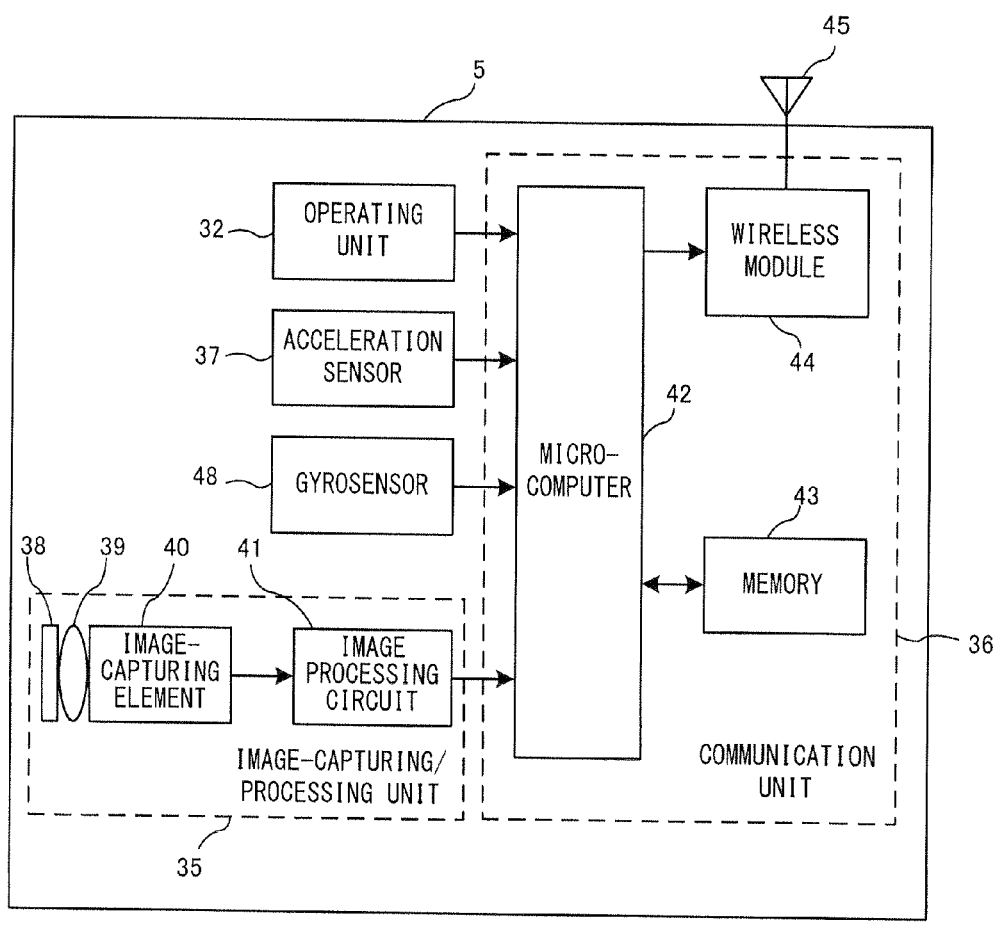
FIG. 5 is a block diagram showing a configuration of an example non-limiting controller.

FIG. 5 is a block diagram illustrating a configuration of the example controller 5. The controller 5 includes an operating unit 32 (the operation buttons 32a to 32i), the image-capturing/processing unit 35, a communication unit 36, the acceleration sensor 37, and a gyrosensor 48. The controller 5 transmits, as operation data, data representing the content of an operation performed on the controller 5 itself, to the game device 3. Note that hereinafter, in some cases, operation data transmitted by the controller 5 is referred to as "controller operation data", and operation data transmitted by the terminal device 7 is referred to as "terminal operation data".

The operating unit 32 includes the operation buttons 32a to 32i described above, and outputs, to the microcomputer 42 of the communication unit 36, operation button data indicating an input state (that is, whether or not each operation button 32a to 32i is pressed) of each operation button 32a to 32i.

The image-capturing/processing unit 35 is a system for analyzing image data taken by the image-capturing mechanism and calculating, for example, the centroid and the size of an area having a high brightness in the image data. The image-capturing/processing unit 35 includes the infrared filter 38, the lens 39, the image-capturing element 40 and the image processing circuit 41. The infrared filter 38 transmits therethrough only infrared light included in the light incident on the front surface of the controller 5. The lens 39 collects the infrared light transmitted through the infrared filter 38 so as to be incident on the image-capturing element 40. The image-capturing element 40 is a solid-state imaging device such as, for example, a CMOS sensor or a CCD sensor, which receives the infrared light collected by the lens 39, and outputs an image signal. The marker unit 55 of the terminal device 7 and the marker device 6, which are subjects to be imaged, include markers for outputting infrared light. Therefore, the infrared filter 38 enables the image-capturing element 40 to receive only the infrared light transmitted through the infrared filter 38 and generate image data, so that an image of each subject to be imaged (the marker unit 55 and/or the marker device 6) can be taken with enhanced accuracy. Hereinafter, the image captured by the image-capturing element 40 will be referred to as the captured image. The image generated by the image-capturing element 40 is processed by the image processing circuit 41. The image processing circuit 41 calculates, in the captured image, the positions of subjects to be imaged. The image processing circuit 41 outputs data representing coordinate points of the calculated positions, to the microcomputer 42 of the communication unit 36. The data representing the coordinate points is transmitted as operation data to the game device 3 by the microcomputer 42. Hereinafter, the coordinate points are referred to as "marker coordinate points". The marker coordinate point changes depending on the attitude (angle of tilt) and/or the position of the controller 5 itself, and therefore the game device 3 is allowed to calculate the attitude and the position of the controller 5 using the marker coordinate point.

In another example embodiment, the controller 5 may not necessarily include the image processing circuit 41, and the controller 5 may transmit the captured image as it is to the game device 3. At this time, the game device 3 may have a circuit or a program, having the same function as the image processing circuit 41, for calculating the marker coordinate point.

The acceleration sensor 37 detects accelerations (including a gravitational acceleration) of the controller 5, that is, force (including gravity) applied to the controller 5. The acceleration sensor 37 detects a value of an acceleration (linear acceleration) applied to a detection unit of the acceleration sensor 37 in the straight line direction along the sensing axis direction, among all accelerations applied to a detection unit of the acceleration sensor 37. While the acceleration sensor 37 may be any acceleration sensor capable of detecting the acceleration for one or more sensing axes, the acceleration sensor 37 in the example embodiment detects the linear acceleration for the three axis directions with respect to the controller 5, i.e., the up-down direction (the Y-axis direction shown in FIG. 3), the left-right direction (the X-axis direction shown in FIG. 3), and the front-back direction (the Z-axis direction shown in FIG. 3). The acceleration sensor 37 is, for example, a capacitive MEMS (Micro-Electro Mechanical System) acceleration sensor. However, another type of acceleration sensor may be used. Data (acceleration data) representing the acceleration detected by the acceleration sensor 37 is outputted to the communication unit 36. The acceleration detected by the acceleration sensor 37 changes depending on the attitude (angle of tilt) and the movement of the controller 5, and therefore the game device 3 is allowed to calculate the attitude and the movement of the controller 5 using the obtained acceleration data. In the present example embodiment, the game device 3 calculates the attitude, angle of tilt, etc., of the controller 5 based on the obtained acceleration data.

The gyrosensor 48 detects angular rates about three axes (in the present example embodiment, the X-, Y-, and Z-axes). In the present specification, the directions of rotation about the X-axis, the Y-axis, and the Z-axis relative to the imaging direction (the Z-axis positive direction) of the controller 5 are referred to as a pitch direction, a yaw direction, and a roll direction, respectively. So long as the gyrosensor 48 can detect the angular rates about the three axes, any number thereof may be used, and also any combination of sensors may be included therein. Data representing the angular rates detected by the gyrosensor 48 is outputted to the communication unit 36. Alternatively, the gyrosensor 48 may simply detect an angular rate about one axis or angular rates about two axes.

The communication unit 36 includes the microcomputer 42, a memory 43, the wireless module 44 and the antenna 45. With the communication unit 36 (the wireless module 44 and the antenna 45), the controller 5 functions as a wireless controller. The microcomputer 42 controls the wireless module 44 for wirelessly transmitting, to the game device 3, data obtained by the microcomputer 42 while using the memory 43 as a storage area in the process.

Data outputted by the operating unit 32, the image-capturing/processing unit 35, the acceleration sensor 37, and the gyrosensor 48 to the microcomputer 42 is temporarily stored in the memory 43. These data are transmitted to the game device 3 as operation data (controller operation data). Specifically, at the time of the transmission to the controller communication module 19 of the game device 3, the microcomputer 42 outputs the operation data stored in the memory 43 to the wireless module 44. The wireless module 44 uses, for example, the Bluetooth (registered trademark) technology to transmit the operation data to the game device 3. The CPU 10 of the game device 3 performs the game process using the operation data obtained from the controller 5. The wireless transmission from the communication unit 36 to the controller communication module 19 is sequentially performed at a predetermined time interval. Since the game process is generally performed at a cycle of 1/60 sec. (corresponding to one frame time), data may be transmitted at a cycle of a shorter time period.

As described above, the controller 5 can transmit marker coordinate data, acceleration data, angular rate data, and operation button data as operation data representing operations performed thereon. In addition, the game device 3 executes the game process using the operation data as game inputs. Accordingly, by using the controller 5, the user can perform the game operation of moving the controller 5 itself, in addition to conventionally general game operations of pressing operation buttons. For example, it is possible to perform the operations of tilting the controller 5 to arbitrary attitudes, pointing the controller 5 to arbitrary positions on the screen, and moving the controller 5 itself.

Also, in the present example embodiment, the controller 5 is not provided with any display unit for displaying game images, but the controller 5 may be provided with a display unit for displaying an image or suchlike to indicate, for example, a remaining battery level.

[4. Configuration of Terminal Device 7]

Figure 6:
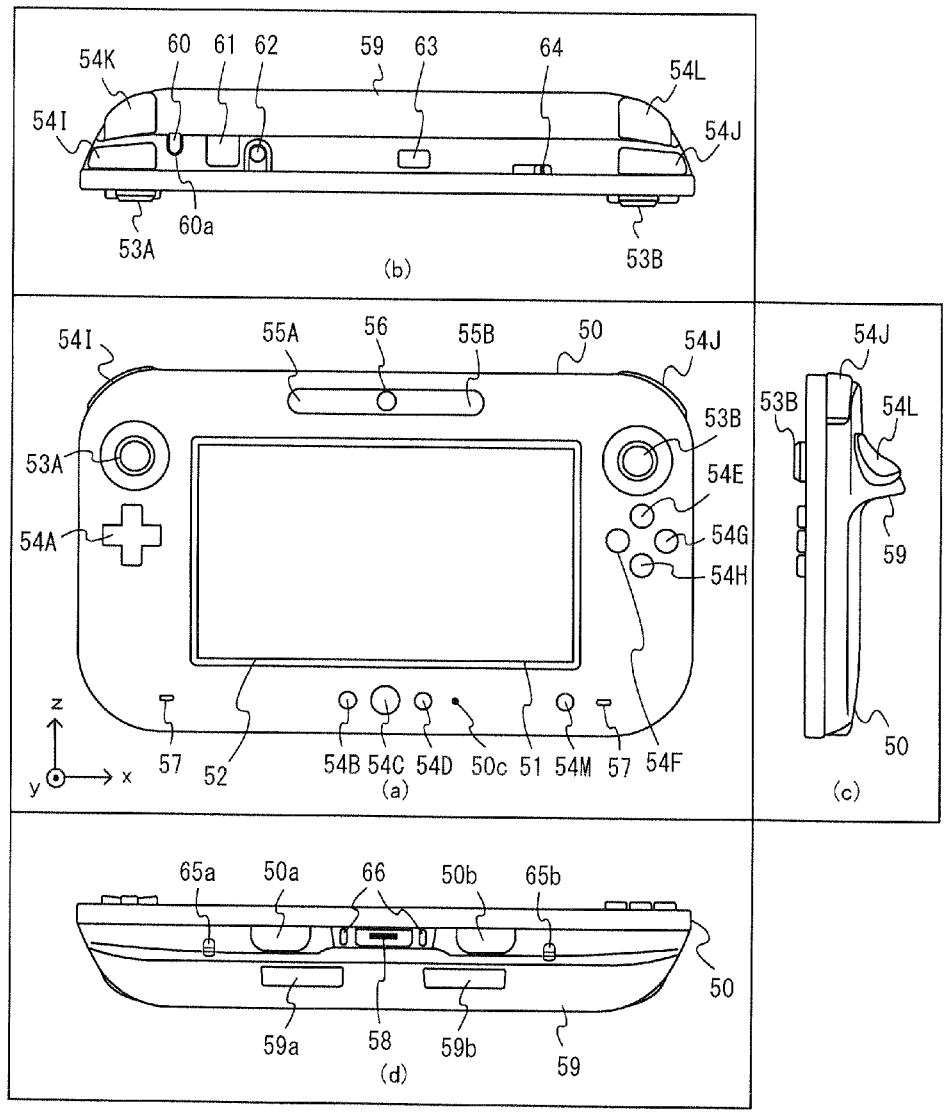
FIG. 6 is a diagram showing an external configuration of an example non-limiting terminal device.
Figure 8:
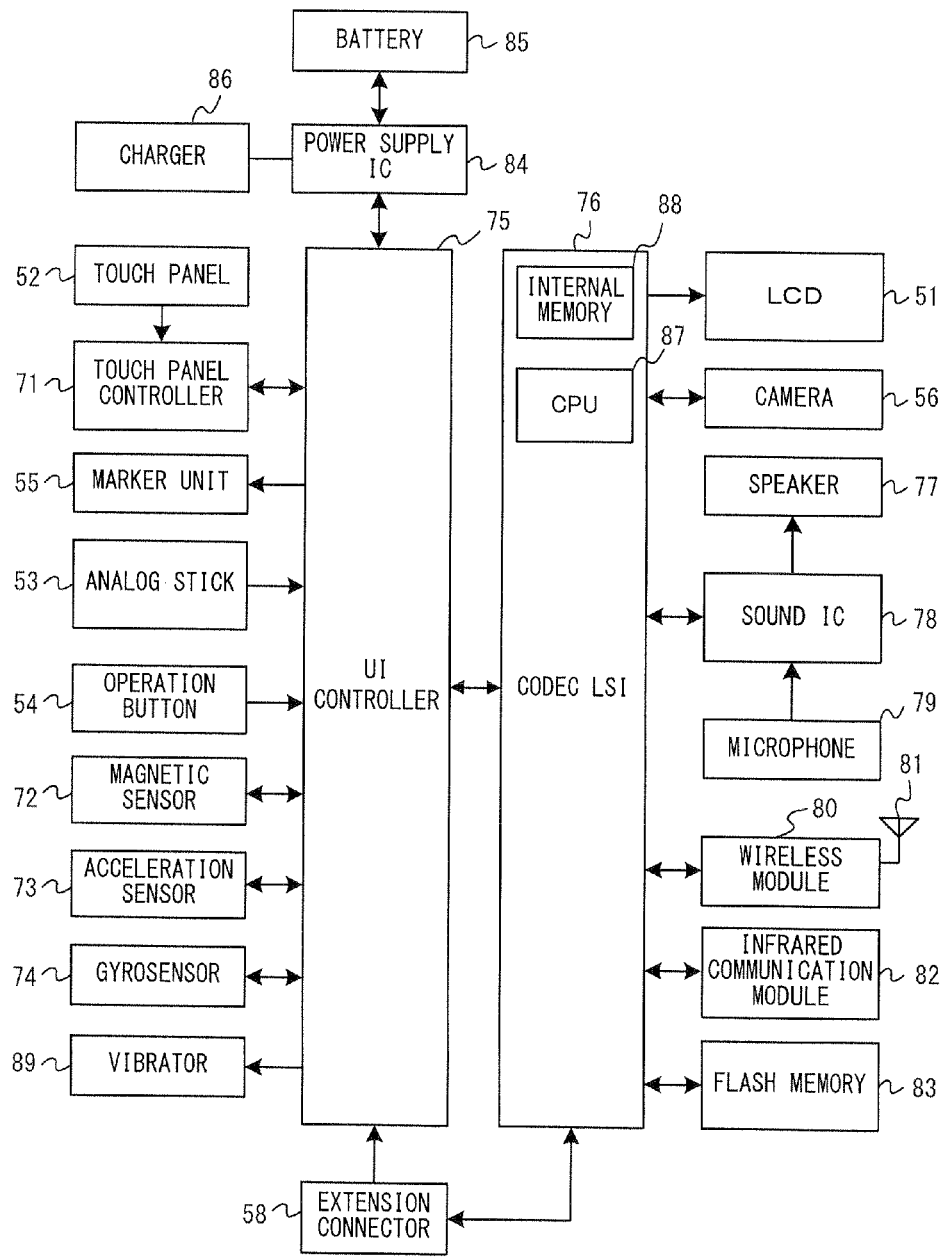
FIG. 8 is a block diagram showing an internal configuration of an example non-limiting terminal device.

Next, a configuration of a terminal device 7 will be described with reference to FIGS. 6 to 8. FIG. 6 is a plan view showing an external configuration of the example terminal device 7. FIG. 6(*a*) is a front view of the terminal device 7, FIG. 6(*b*) is a top view thereof, FIG. 6(*c*) is a right side view thereof, and FIG. 6(*d*) is a bottom view thereof. FIG. 7 is a back view of the example terminal device 7. Note that the terminal device 7 may be of any configuration including an operation unit and a display unit. Since the terminal device 7 includes a display unit, the player using the terminal device 7 can play the game while looking at the game image displayed on the display unit.

As shown in FIG. 6, the terminal device 7 includes a housing 50 generally in a horizontally-elongated rectangular plate shape. It can also be said that the terminal device 7 is a tablet-type information processing device. The housing 50 may have a curved surface or may have some protrusions, etc., as long as it is generally in a plate shape. The housing 50 is sized so that it can be held by the user. Thus, the user can hold and move the terminal device 7, and can change the position in which the terminal device 7 is placed. Although the details will be described later, the terminal device 7 is configured so that it is easily held and operated by the user even though it is such a relatively large terminal device (controller device) as described above.

The terminal device 7 includes an LCD 51 on the front surface (front side) of the housing 50. The LCD 51 is provided near the center of the surface of the housing 50. Therefore, the user can hold and move the terminal device 7 while looking at the screen of the LCD 51 by holding opposing end portions of the housing 50 with respect to the LCD 51. The user can hold the terminal device 7 in a landscape position (in a horizontally-oriented direction) by holding left and right opposing end portions of the housing 50 with respect to the LCD 51, or the user can hold the terminal device 7 in a portrait position (in a vertically-oriented direction).

As shown in FIG. 6(*a*), the terminal device 7 includes a touch panel 52 on the screen of the LCD 51 as an operation mechanism. The touch panel 52 may be of any type, including a resistive type, a capacitive type, etc. The touch panel 52 may be of a single-touch type or a multi-touch type. Inputs on the touch panel 52 can be made with a touch pen 60, a finger of the user, etc. The housing 50 is provided with a hole 60a for accommodating the touch pen 60 used for performing operations on the touch panel 52 (see FIG. 6(b)). While the hole 60a is provided on the upper surface of the housing 50 so that the touch pen 60 does not fall, it may be provided on the side surface or the bottom surface.

As shown in FIG. 6, the terminal device 7 includes two analog sticks (slide pads) 53A and 53B and a plurality of buttons (keys) 54A to 54M, as operation mechanisms (operation units). The analog sticks 53A and 53B are each a direction-specifying device. The analog sticks 53A and 53B are each configured so that the movable member (stick portion) can be slid in any direction (at any angle in the up, down, left, right and diagonal directions) with respect to the surface of the housing 50. The movable member of each of the analog sticks 53A and 53B may be of such a type that it is tilted in any direction with respect to the surface of the housing 50. The left analog stick 53A is provided on the left side of the screen of the LCD 51, and the right analog stick 53B is provided on the right side of the screen of the LCD 51.

The buttons 54A to 54L are operation mechanisms (operation units) for making predetermined inputs, and are keys that can be pressed. As will be discussed below, the buttons 54A to 54L are provided at such positions that the user can operate them while holding the left and right portions of the terminal device 7. Therefore, the user can easily operate these operation mechanisms even when holding and moving the terminal device 7.

As shown in FIG. 6(a), the cross button (direction-input button) 54A and the buttons 54B to 54H and 54M, of the operation buttons 54A to 54L, are provided on the front surface of the housing 50. These buttons 54A to 54H and 54M are provided at positions at which they can be operated by the thumbs of the user. The cross button 54A is provided on the left side of the LCD 51 and under the left analog stick 53A. The cross button 54A has a cross shape, and is a button with which it is possible to specify at least up, down, left and right directions.

The buttons 54B to 54D are provided on the lower side of the LCD 51. These three buttons 54B to 54D are provided at positions at which they can be operated with either the left or the right hand. The terminal device 7 includes the power button 54M for turning ON/OFF the power of the terminal device 7. The power of the game device 3 can be remotely turned ON/OFF by operating the power button 54M. The power button 54M is provided on the lower side of the LCD 51 as are the buttons 54B to 54D. The power button 54M is provided on the right side of the buttons 54B to 54D. The four buttons 54E to 54H are provided on the right side of the LCD 51 and under the right analog stick 53B. Moreover, the four buttons 54E to 54H are provided on the upper, lower, left and right side (of the center position among the four buttons 54E to 54H). Therefore, with the terminal device 7, the four buttons 54E to 54H can also serve as buttons with which the user specifies the up, down, left and right directions.

In the present embodiment, a projecting portion (an eaves portion 59) is provided on the back side of the housing 50 (the side opposite to the front surface where the LCD 51 is provided) (see FIGS. 6(c) and 7). As shown in FIG. 6(c), the eaves portion 59 is a mountain-shaped member which is projecting from the back surface of the generally plate-shaped housing 50. The projecting portion has such a height (thickness) that it can rest on fingers of the user holding the back surface of the housing 50. The user can hold the terminal device 7 stably without getting tired even if the terminal device 7 has a relatively large size by holding the terminal device 7 while resting fingers on the eaves portion 59 (placing the eaves portion 59 on the fingers). That is, the eaves portion 59 can be referred to as a supporting member by means of which the housing 50 is supported by fingers, and can be referred to also as a finger-resting portion.

The eaves portion 59 is provided above the center of the housing 50 with respect to the up/down direction. The eaves portion 59 is provided on the reverse side so as to generally correspond to the operation units (the analog sticks 53A and 53B) which are provided on the front surface of the housing 50. That is, the projecting portion is provided so as to extend across an area on the reverse side including positions corresponding to the operation units which are provided respectively on the left side and on the right side of the display unit. Therefore, when operating the operation unit, the user can hold the terminal device 7 so as to support the eaves portion 59 with the middle fingers or the ring fingers. Then, it is easier to hold the terminal device 7, and it is easier to operate the operation units. In the present embodiment, since the projecting portion has an eaves-like shape extending in the left/right direction, the user can hold the terminal device 7 with the middle fingers or the ring fingers placed along the bottom surface of the projecting portion, making it easier to hold the terminal device 7. The eaves portion 59 is not limited to the shape extending in the horizontal direction as shown in FIG. 7, as long as it is formed so that it (i.e., a portion thereof that is projecting) extends in the left/right direction.

The present embodiment employs the eaves portion 59 having a shape of an eaves as the projecting portion formed on the back surface of the housing, but the projecting portion may have any other suitable shape. For example, in other embodiments, two projecting portions may be provided in the left and right opposing portions (with no projecting portion in the center of the left/right direction) on the back side of the housing 50. In other embodiments, the cross-sectional shape (the shape along the cross section vertical to the x-axis direction) of the projecting portion may have an arched shape (which opens downward) so that the terminal device 7 can be more firmly supported by the fingers of the user (so that the projecting portion more firmly rests on the fingers).

The width of the projecting portion (the eaves portion 59) in the up/down direction may be of any value. For example, the projecting portion may be formed so as to extend to the top side of the housing 50. That is, the upper surface of the projecting portion may be formed at the same position as the side surface on the upper side of the housing 50. Then, the housing 50 has a 2-tiered structure with the thin lower side and the thick upper side. As described above, the housing 50 may include a down-facing surface (the bottom surface of the projecting portion) formed in the left and right opposing portions of the back surface.

As shown in FIGS. 6(a), 6(b) and 6(c), a first L button 54I and a first R button 54J are provided respectively in the right and left opposing portions on the upper surface of the housing 50. In other embodiments, the operation units provided respectively in the left and right portions of the upper surface of the housing 50 do not have to be provided at the left end and the right end, and may be provided at positions other than the end portions. The operation units may be provided respectively on the left and right side surfaces of the housing 50. As shown in FIGS. 6(c) and 7, a second L button 54K and a second R button 54L are provided on the upper surface of the projecting portion (the eaves portion 59). The second L button 54K is provided near the left end of the eaves portion 59. The second R button 54L is provided near the right end of the eaves portion 59.

In the present embodiment, the user can easily hold the terminal device 7 by holding the terminal device 7 with fingers abutting against the bottom surface of the projecting portion (the eaves portion 59). Since the first L button 54I and the first R button 54J are provided on the upper surface of the housing 50 and the second L button 54K and the second R button 54L are provided on the upper surface of the projecting portion, the user can easily operate these buttons in such a state as described above. Note that the user can hold the terminal device 7 with the ring fingers abutting against the bottom surface of the eaves portion 59 (so as to support the eaves portion 59 with the ring fingers), or can also hold the terminal device 7 with the middle fingers abutting against the bottom surface of the eaves portion 59.

With the terminal device 7 of the present embodiment, since the projecting portion (the eaves portion 59) is provided on the back surface, if the terminal device 7 is put down with the screen of the LCD 51 (the front surface of the housing 50) facing up, the screen is slightly inclined. Therefore, the screen is more easily seen with the terminal device 7 put down. Input operations to the touch panel 52 are more easily performed with the terminal device 7 put down. In other embodiments, an additional projecting portion having generally the same height as the eaves portion 59 may be formed on the back surface of the housing 50. Then, with the screen of the LCD 51 facing up, the terminal device 7 can be put down so that the screen is horizontal with the projecting portions in contact with the floor surface. The additional projecting portion may be a removable (or foldable) member. Then, the terminal device can be put down with the screen either slightly inclined or with the screen horizontal. That is, in a case in which the terminal device 7 is put down and used, the eaves portion 59 can be used as a leg portion.

The buttons 54A to 54L are each assigned a function in accordance with the game program. For example, the cross button 54A and the buttons 54E to 54H may be used for direction-specifying operations, selection operations, etc., whereas the buttons 54B to 54E may be used for OK button operations, cancel button operations, etc. The terminal device 7 may include a button for turning ON/OFF the power of the LCD 51, and a button for performing a connection setting (pairing) with the game device 3.

As shown in FIG. 6(a), the terminal device 7 includes the marker unit 55 including a marker 55A and a marker 55B on the front surface of the housing 50. The marker unit 55 is provided on the upper side of the LCD 51. The marker 55A and the marker 55B are each formed by one or more infrared LEDs, as are the markers 6R and 6L of the marker device 6. The infrared LEDs of the markers 55A and 55B are provided inside a window portion that is transmissive to infrared light. The marker unit 55 is used for the game device 3 to calculate the movement, etc., of the controller 5, as is the marker device 6 described above. The game device 3 can control the lighting of the infrared LEDs of the marker unit 55.

The terminal device 7 includes a camera 56 as an image-capturing mechanism. The camera 56 includes an image-capturing element (e.g., a CCD image sensor, a CMOS image sensor, or the like) having a predetermined resolution, and a lens. As shown in FIG. 6, the camera 56 is provided on the front surface of the housing 50 in the present embodiment. Therefore, the camera 56 can capture an image of the face of the user holding the terminal device 7, and can capture an image of the user playing a game while looking at the LCD 51, for example. In the present embodiment, the camera 56 is provided between the two markers 55A and 55B.

The terminal device 7 includes a microphone 79 as a sound input mechanism. A microphone hole 50c is provided on the front surface of the housing 50. The microphone 79 is provided inside the housing 50 behind the microphone hole 50c. The microphone 79 detects sounds around the terminal device 7 such as the voice of the user.

The terminal device 7 includes a speaker 77 as a sound output mechanism. As shown in FIG. 6(d), speaker holes 57 are provided in a lower portion of the front surface of the housing 50. The output sounds from the speaker 77 are outputted from the speaker holes 57. In the present embodiment, the terminal device 7 includes two speakers, and the speaker holes 57 are provided at the respective positions of each of the left speaker and the right speaker. The terminal device 7 includes a knob 64 for adjusting the sound volume of the speaker 77. The terminal device 7 includes a sound output terminal 62 for receiving a sound output unit such as an earphone connected thereto. Although the sound output terminal 62 and the knob 64 are provided on the upper side surface of the housing 50 considering the fact that the additional device is connected to the lower side surface of the housing, they may alternatively be provided on the left or right side surface or on the lower side surface.

The housing 50 includes a window 63 through which an infrared signal from an infrared communication module 82 is emitted to the outside of the terminal device 7. The window 63 is herein provided on the upper side surface of the housing 50 so that the infrared signal is emitted in a forward direction of the user when the user holds the opposing sides of the LCD 51. In other embodiments, the window 63 may be provided at any position such as, for example, on the back surface of the housing 50.

The terminal device 7 includes an extension connector 58 via which another device can be connected to the terminal device 7. The extension connector 58 is a communication terminal for exchanging data (information) with another device connected to the terminal device 7. The additional device connected to the extension connector 58 may be any device, and may be, for example, a game-specific controller (gun-shaped controller, etc.) or an input device such as a keyboard. The extension connector 58 may be omitted if there is no need to connect an additional device to terminal device 7. The extension connector 58 may include a terminal for supplying power to the additional device or a terminal for charging.

In addition to the extension connector 58, the terminal device 7 includes a charging terminal 66 for obtaining power from an additional device. When the charging terminal 66 is connected to a charging stand (not shown), power is supplied from the charging stand to the terminal device 7.

The terminal device 7 includes a charging connector, and the housing 50 includes a cover portion 61 for protecting the charging connector. The charging connector can be connected to a charger 86 to be described below, and power is supplied from the charger 86 to the terminal device 7 when the charging connector is connected to the charger.

As shown in FIGS. 6(d) and 7, engagement holes 59a and 59b with which tab portions of an additional device can engage are provided on the bottom surface of the projecting portion (the eaves portion 59). Engagement holes 50a and 50b are provided on the bottom surface of the housing 50. In a case in which the additional device is connected to the terminal device 7, four tab portions of the additional device are respectively engaged with the four engagement holes, thereby securing the terminal device 7 and the additional device with each other.

The terminal device 7 includes a battery cover 67 which can be attached to and removed from the housing 50. A battery (a battery 85 shown in FIG. 8) is placed inside the battery cover 67. In the present embodiment, the battery cover 67 is provided on the back side of the housing 50, below the projecting portion (the eaves portion 59).

The housing 50 of the terminal device 7 includes holes 65a and 65b through which a strap cord can be tied to the terminal device 7. The user can tie a strap to one of the holes 65a and 65b, and fasten the strap to the wrist of the user. Then, even if the user drops the terminal device 7 or if the terminal device 7 comes off the hand, the terminal device 7 is prevented from falling or hitting other objects.

With the terminal device 7 shown in FIGS. 6 and 7, the shape of each operation button, the shape of the housing 50, the number and the positions of the components, etc., are merely illustrative, and the present invention can be realized with other shapes, numbers, and positions.

Next, an internal configuration of the terminal device 7 will be described with reference to FIG. 8. FIG. 8 is a block diagram showing an internal configuration of the example terminal device 7. As shown in FIG. 8, in addition to the configuration shown in FIG. 6, the terminal device 7 includes a touch panel controller 71, a magnetic sensor 72, the acceleration sensor 73, the gyrosensor 74, a user interface controller (UI controller) 75, a codec LSI 76, the speaker 77, a sound IC 78, the microphone 79, a wireless module 80, an antenna 81, an infrared communication module 82, a flash memory 83, a power supply IC 84, a battery 85, and a vibrator 89. These electronic components are mounted on an electronic circuit board and accommodated in the housing 50.

The UI controller 75 is a circuit for controlling the input/output of data to/from various types of input/output units. The UI controller 75 is connected to the touch panel controller 71, an analog stick 53 (the analog sticks 53A and 53B), an operation button 54 (the operation buttons 54A to 54L), the marker unit 55, the magnetic sensor 72, the acceleration sensor 73, the gyrosensor 74, and the vibrator 89. The UI controller 75 is connected to the codec LSI 76 and the extension connector 58. The power supply IC 84 is connected to the UI controller 75, and power is supplied to various units via the UI controller 75. The built-in battery 85 is connected to a power supply IC 84 to supply power. The charger 86 or a cable with which power can be obtained from an external power source can be connected to the power supply IC 84 via a charging connector, and the terminal device 7 can receive power supply from or be charged by an external power source using the charger 86 or the cable. The terminal device 7 may be charged by attaching the terminal device 7 to a cradle (not shown) having a charging function.

The touch panel controller 71 is a circuit connected to the touch panel 52 for controlling the touch panel 52. The touch panel controller 71 generates input position data of a predetermined format based on signals from the touch panel 52, and outputs it to the UI controller 75. The input position data represents, for example, the coordinates of a position on the input surface of the touch panel 52 at which an input is made. The touch panel controller 71 reads a signal from the touch panel 52 and generates input position data at a rate of once per a predetermined amount of time. Various control instructions for the touch panel 52 are outputted from the UI controller 75 to the touch panel controller 71.

The analog stick 53 outputs, to the UI controller 75, stick data representing the direction and the amount of slide (or tilt) of the stick portion operated with a finger of the user. The operation button 54 outputs, to the UI controller 75, operation button data representing the input status of each of the operation buttons 54A to 54L (e.g., whether it is pressed).

The magnetic sensor 72 detects the azimuthal direction by sensing the size and direction of the magnetic field. Azimuthal direction data representing the detected azimuthal direction is outputted to the UI controller 75. Control instructions for the magnetic sensor 72 are outputted from the UI controller 75 to the magnetic sensor 72. While there are sensors using an MI (magnetic impedance) element, a fluxgate sensor, a Hall element, a GMR (giant magneto-resistive) element, a TMR (tunnel magneto-resistance) element, an AMR (anisotropic magneto-resistive) element, etc., the magnetic sensor 72 may be any sensor as long as it is possible to detect the azimuthal direction. Strictly speaking, in a place where there is a magnetic field other than the geomagnetic field, the obtained azimuthal direction data does not represent the azimuthal direction. Nevertheless, if the terminal device 7 moves, the azimuthal direction data changes, and it is therefore possible to calculate the change in the attitude of the terminal device 7.

The acceleration sensor 73 is provided inside the housing 50 for detecting the magnitude of the linear acceleration along each of the directions of the three axes (the x, y and z axes shown in FIG. 6(a)). Specifically, the acceleration sensor 73 detects the magnitude of the linear acceleration along each of the axes, where the x axis lies in the longitudinal direction of the housing 50, the y axis lies in the direction vertical to the surface of the housing 50, and the z axis lies in the width direction of the housing 50. Acceleration data representing the detected acceleration is outputted to the UI controller 75. Control instructions for the acceleration sensor 73 are outputted from the UI controller 75 to the acceleration sensor 73. While the acceleration sensor 73 is assumed to be a capacitive-type MEMS-type acceleration sensor, for example, in the present embodiment, other types of acceleration sensors may be employed in other embodiments. The acceleration sensor 73 may be an acceleration sensor for 1-axis or 2-axis detection.

The gyrosensor 74 is provided inside the housing 50 for detecting angular velocities about the three axes, i.e., the x-axis, the y-axis and the z-axis. Angular velocity data representing the detected angular velocities is outputted to the UI controller 75. Control instructions for a gyrosensor 74 are outputted from the UI controller 75 to the gyrosensor 74. The number and combination of gyrosensors used for detecting angular velocities about three axes may be any number and combination, and the gyrosensor 74 may be formed by a 2-axis gyrosensor and a 1-axis gyrosensor, as is the gyrosensor 48. The gyrosensor 74 may be a gyrosensor for 1-axis or 2-axis detection.

The vibrator 89 is, for example, a vibration motor or a solenoid, and is connected to the UI controller 75. The terminal device 7 is vibrated by actuation of the vibrator 89 in response to a command from the UI controller 75. Thus, a so-called vibration-feedback game is realized, in which the vibration is conveyed to the user's hand holding the terminal device 7.

The UI controller 75 outputs, to the codec LSI 76, operation data including input position data, stick data, operation button data, azimuthal direction data, acceleration data, and angular velocity data received from various components described above. If another device is connected to the terminal device 7 via the extension connector 58, data representing an operation performed on the other device may be further included in the operation data.

The codec LSI 76 is a circuit for performing a compression process on data to be transmitted to the game device 3, and an expansion process on data transmitted from the game device 3. The LCD 51, the camera 56, the sound IC 78, the wireless module 80, the flash memory 83, and the infrared communication module 82 are connected to the codec LSI 76. The codec LSI 76 includes a CPU 87 and an internal memory 88. While the terminal device 7 does not itself perform game processes, the terminal device 7 may execute a minimal program for the management thereof and for the communication. When the terminal device 7 is started up, a program stored in the flash memory 83 is read out to the internal memory 88 and executed by the CPU 87 upon power-up. Some area of the internal memory 88 is used as the VRAM for the LCD 51.

The camera 56 captures an image in response to an instruction from the game device 3, and outputs the captured image data to the codec LSI 76. Control instructions for the camera 56, such as an image-capturing instruction, are outputted from the codec LSI 76 to the camera 56. Camera 56 can also record video. That is, the camera 56 can repeatedly capture images and repeatedly output the image data to the codec LSI 76.

The sound IC 78 is a circuit connected to the speaker 77 and the microphone 79 for controlling input/output of sound data to/from the speaker 77 and the microphone 79. That is, when sound data is received from the codec LSI 76, the sound IC 78 outputs sound signals obtained by performing D/A conversion on the sound data to the speaker 77 so that sound is outputted from the speaker 77. The microphone 79 detects sounds propagated to the terminal device 7 (the sound of the user, etc.), and outputs sound signals representing such sounds to the sound IC 78. The sound IC 78 performs A/D conversion on the sound signals from the microphone 79 to output sound data of a predetermined format to the codec LSI 76.

The infrared communication module 82 emits an infrared signal to perform infrared communication with another device. Here, for example, the infrared communication module 82 has the function of performing infrared communication in accordance with the IrDA standard and the function of outputting an infrared signal (control signal) to control the television 2.

The codec LSI 76 transmits, as terminal operation data, image data from the camera 56, sound data from the microphone 79 and operation data from the UI controller 75 to the game device 3 via the wireless module 80. In the present embodiment, the codec LSI 76 performs a compression process similar to that of the codec LSI 27 on the image data and the sound data. The terminal operation data and the compressed image data and sound data are outputted, as transmit data, to the wireless module 80. The antenna 81 is connected to the wireless module 80, and the wireless module 80 transmits the transmit data to the game device 3 via the antenna 81. The wireless module 80 has a similar function to that of the terminal communication module 28 of the game device 3. That is, the wireless module 80 has a function of connecting to a wireless LAN by a scheme in conformity with the IEEE 802.11n standard, for example. The transmitted data may be encrypted as necessary or may not be encrypted.

As described above, the transmit data transmitted from the terminal device 7 to the game device 3 includes operation data (the terminal operation data), image data, and sound data. In a case in which another device is connected to the terminal device 7 via the extension connector 58, data received from the other device may be further included in the transmit data. The codec LSI 76 may transmit, to the game device 3, data received via infrared communication by the infrared communication module 82 while it is included in the transmit data as necessary.

As described above, compressed image data and sound data are transmitted from the game device 3 to the terminal device 7. These data are received by the antenna 81 (receiving unit), and is sent to the codec LSI 76 via the wireless module 80. The codec LSI 76 expands the received image data and sound data. The expanded image data is outputted to the LCD 51, and images are displayed on the LCD 51. That is, the codec LSI 76 (the CPU 87) displays the received image data on the display unit. The expanded sound data is outputted to the sound IC 78, and the sound IC 78 outputs sounds from the speaker 77.

In a case in which control data is included in data received from the game device 3, the codec LSI 76 and the UI controller 75 give control instructions to various units in accordance with the control data. As described above, the control data is data representing control instructions for the components of the terminal device 7 (the camera 56, the touch panel controller 71, the marker unit 55, sensors 62 to 64, and the infrared communication module 82 in the present embodiment). In the present embodiment, control instructions represented by control data may be instructions to activate the operation of the components or deactivate (stop) the operation thereof. That is, components that are not used in a game may be deactivated in order to reduce the power consumption, in which case it is ensured that data from the deactivated components are not included in the transmit data transmitted from the terminal device 7 to the game device 3. For the marker unit 55, which is an infrared LED, the control can be done simply by turning ON/OFF the power supply thereto.

Furthermore, the game device 3 is capable of controlling output of the infrared communication module 82, thereby controlling the operation of the television 2. Specifically, the game device 3 outputs an instruction (control data as mentioned above) to the terminal device 7, thereby causing the infrared communication module 82 to output an infrared signal corresponding to a control command for controlling the television 2. In response to this instruction, the codec LSI 76 causes the infrared communication module 82 to output an infrared signal corresponding to the control command. Here, the television 2 includes an infrared light reception section capable of receiving the infrared signal. By the infrared light reception section receiving the infrared signal outputted by the infrared communication module 82, the television 2 operates in accordance with the infrared signal. Note that the instruction from the game device 3 may indicate the pattern of the infrared signal, or when the terminal device 7 has the infrared signal pattern stored therein, the game device 3 may provide an instruction to indicate the pattern.

While the terminal device 7 includes operation mechanisms such as the touch panel 52, an analog stick 53 and the operation button 54, as described above, in other embodiments, other operation mechanisms may be included instead of, or in addition to, these operation mechanisms.

While the terminal device 7 includes the magnetic sensor 72, the acceleration sensor 73 and the gyrosensor 74 as sensors for calculating movement of the terminal device 7 (including the position and the attitude thereof, or changes in the position and the attitude thereof), it may only include one or two of these sensors in other embodiments. In other embodiments, other sensors may be included instead of, or in addition to, these sensors.

While the terminal device 7 includes the camera 56 and the microphone 79, it may not include the camera 56 and the microphone 79 or it may include only one of them in other embodiments.

While the terminal device 7 includes the marker unit 55 as a configuration for calculating the positional relationship between the terminal device 7 and the controller 5 (the position and/or attitude, etc., of the terminal device 7 as seen from the controller 5), it may not include the marker unit 55 in other embodiments. In other embodiments, the terminal device 7 may include other mechanisms as a configuration for calculating the positional relationship. For example, in other embodiments, the controller 5 may include a marker unit, and the terminal device 7 may include an image-capturing element. Moreover, in such a case, the marker device 6 may include an image-capturing element, instead of an infrared LED.

[5. Outline of Game Processes]

Next, an outline of game processes to be performed on the game system 1 of the present embodiment will now be explained. The game performed by the game processes is a multi-player game in which a plurality of players play the game simultaneously using a terminal device 7 and a plurality of controllers 5 as controller devices. The example below is directed to a case in which the game system 1 includes three controllers 5, and in which the three controllers 5 are used. That is, in the example below, the game is played by a total of four players, including one player using the terminal device 7 and three players each using one of the three controllers 5. In other embodiments, the number of controllers 5 is not limited to the above.

Figure 9:
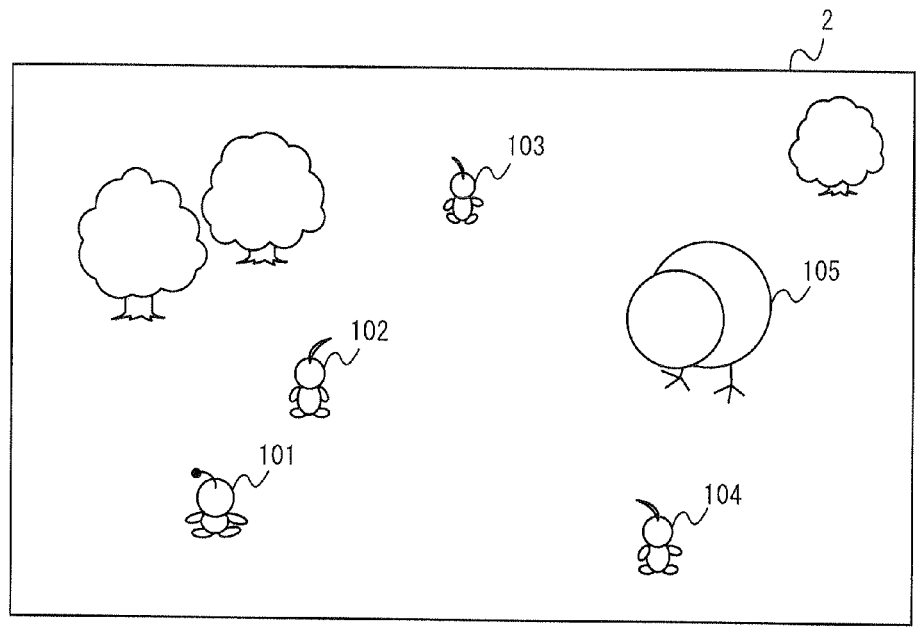
FIG. 9 is a diagram showing an example non-limiting television game image.
Figure 10:
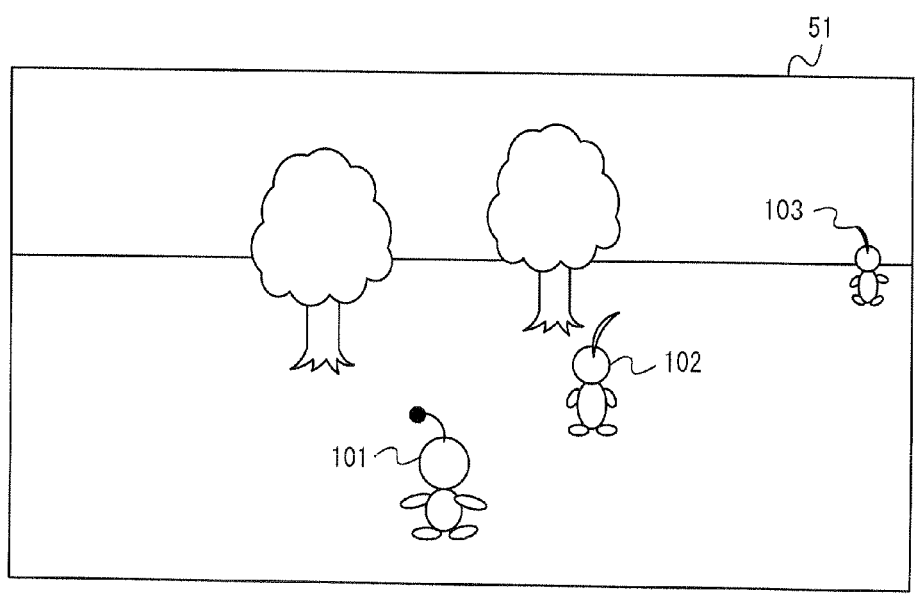
FIG. 10 is a diagram showing an example non-limiting terminal game image.

FIG. 9 is a diagram showing an example of a television game image in the present embodiment. FIG. 10 is a diagram showing an example of a terminal game image in the present embodiment. As shown in FIGS. 9 and 10, a first object 101, three second objects 102 to 104, an enemy object 105, etc., are arranged in the game space. The first object 101 is a control object of the first player. That is, the first object 101 is controlled by the terminal device 7. The second objects 102 to 104 are control objects of the second players. That is, the second objects 102 to 104 are controlled by the controllers 5. The second objects are arranged in the game space while being associated with the controllers 5 in accordance with the number of the controllers 5. In the present embodiment, the same number of second objects 102 to 104 as the number of controllers 5 are arranged in the game space, and each second object is controlled by one controller 5 associated therewith. Note however that in other embodiments, a single controller 5 may be used to control a plurality of second objects associated with the controller 5. Note that although the game to be played on the game system 1 is not limited to any particular contents, the present embodiment shows a game in which players control the objects 101 to 104 with the aim of defeating the enemy object 105.

The game system 1 moves the first object 101 in accordance with an operation performed on the terminal device 7 (step S11 to be described below). The operation performed for moving the first object 101 may be any operation. In the present embodiment, the game system 1 moves the first object 101 in accordance with an input made on the touch panel 52 or the analog stick 53A or 53B of the terminal device 7.

The game system 1 moves the plurality of second objects 102 to 104 in accordance with operations performed on the respective controllers 5 (step S13 to be described below). The operation performed for moving the second objects 102 to 104 may be any operation. In the present embodiment, the game system 1 moves the second objects 102 to 104 in accordance with inputs made on the cross button 32a of the respective controllers 5.

The game system 1 sets the first virtual camera based on the position of the first object 101 in the game space (step S21 to be described below). The first virtual camera is a virtual camera set for generating a terminal game image. The game system 1 displays a terminal game image representing the game space as seen from the first virtual camera on the display unit (the LCD 51) of the terminal device 7. The position and the attitude of the first virtual camera are set based on the position of the first object 101. In the present embodiment, the first virtual camera is set so as to generate a game image in so-called "third-person perspective" as shown in FIG. 10. That is, the first virtual camera is set so that the first object 101 is seen from behind. Note that in other embodiments, the first virtual camera may be set so as to generate a game image in so-called "first-person perspective". That is, the first virtual camera may be set at the position of the first object 101.

The game system 1 sets the second virtual camera based on the positions of the second objects so that at least the plurality of second objects 102 to 104 in the game space are included in the visual field range (steps S23 and S24 to be described below). The second virtual camera is a virtual camera set for generating a television game image. The game system 1 displays a television game image representing the game space as seen from the second virtual camera on a predetermined display device (the television 2) separate from the terminal device 7. In the present embodiment, the position and the attitude of the second virtual camera are set so that the second objects 102 to 104 are seen from above as shown in FIG. 9.

As described above, in the present embodiment, an image representing the game space including therein the second objects 102 to 104, which are the control objects of the controllers 5, is displayed on the television 2. Thus, each second player can play the game while looking at the second object being controlled by the second player as well as the second objects being controlled by the other second players. Therefore, the second player can play the game while feeling the sense of unity, i.e., the sense of "playing the game together with other second players".

In the present embodiment, the game system 1 sets the second virtual camera based on positions of the first object 101 and the plurality of second objects 102 to 104 so that the first object 101 and the plurality of second objects 102 to 104 in the game space are included in the visual field range (step S24 to be described below). That is, in the present embodiment, not only the second objects 102 to 104 but also the first object 101 are included in the visual field range of the second virtual camera and displayed on the television 2. Thus, since the second players can also see the first object 101 being controlled by the first player and successful actions thereof, the sense of unity in the game can also be felt between the first player and the second players, and all the players in the game system 1 can feel the sense of unity in the game. Since each second player can check what the first object 101 is doing, it is possible to give the motivation for cooperative game operations, e.g., the first player and the second players giving instructions to each other, and it is possible to provide a game that is more entertaining.

Note that the first object 101 may move out of the display range of the television 2 under predetermined conditions in the present embodiment (steps S23, S24, S16 and S17 to be described below), the details of which will be described below. Therefore, in the present embodiment, the television image can be said to be an image mainly for the second players. The terminal image can be said to be an image for the first player who is holding the terminal device 7.

In the present embodiment, the first object 101 and the second objects 102 to 104 are arranged in a single game space. The first and second virtual cameras are arranged in the single game space, and images representing the single game space are displayed on the terminal device 7 and the television 2. Herein, the "single game space" is a space defined in a single virtual space through which the first and second objects 101 to 104 can move around. For example, a space above a terrain object which is formed continuously in the virtual space is a single game space. Since the objects 101 to 104 are arranged in a single game space, the players can feel the sense of unity in the game.

In the present embodiment, the game image representing the game space is not displayed on the controller 5. That is, in the present embodiment, since the controller 5 does not have a display unit, the game image itself is not displayed on the controller 5. Therefore, since the second players play the game while looking at the television 2 which displays the objects of the players, the second players can better feel the sense of unity, i.e., the sense of "playing the game together with other second players". Note that embodiments in which the game image representing the game space is not displayed on the controller 5 include the following, in addition to one in which the controller 5 does not include a display unit as in the present embodiment.

(1) An embodiment where although the controller 5 includes a display unit, the game image is not displayed on the display unit.

(2) An embodiment where although the controller 5 includes a display unit, a game image other than the image representing the game space is displayed on the display unit.

In the case of (2) above, "a game image other than the image representing the game space" is, for example, a game title image, a menu screen, etc. Even if the game system 1 employs the embodiment (1) or (2) above, the second players play the game while looking at the television 2 as in the present embodiment, thereby providing similar effects to those of the present embodiment.

Where the controller 5 includes a display unit, the display unit may display a sub-game image. A sub-game image is an image used as a supplement to the second game image. A sub-game image may be one of the following game images, for example.

- A menu screen
- An image representing a simplified version of the game space displayed on the television 2 (e.g., a map image)
- An image displayed on a screen smaller than the display device (the television 2) on which the game image is displayed
- A game image where the image representing the game space is included only in a portion thereof
- An image used for item selection
- An image illustrating game operations Where such as sub-game image is displayed on the controller 5, the second players play the game while mainly looking at the television 2, thereby providing similar effects to those of the present embodiment.

As described above, the controller 5 may include a display unit. Therefore, in other embodiments, the game system 1 may include terminal devices 7 instead of controllers 5. That is, the game system 1 may include three or more terminal devices so that the players perform game operations using the terminal devices.

[6. Details of Processes in Game System]

Next, the details of game processes performed by the present game system will be described. First, various data used in the game processes will be described. FIG. 11 is a diagram showing example data stored in a main memory (the external main memory 12 or the internal main memory 11*e*) of the game device 3. As shown in FIG. 11, the main memory of the game device 3 stores a game program 110, terminal operation data 111, controller operation data 112, and process data 113. In addition to those shown in FIG. 11, the main memory also stores other data used in game processes (image data, sound data, etc.). A part of the storage area shown in FIG. 11 may be provided in a different storage device (a flash memory 17, etc.) that can be accessed by the game device 3.

At an appropriate point in time after the power of the game device 3 is turned ON, a part or whole of the game program 110 is loaded from the optical disc 4 and stored in the main memory. The game program 110 may be obtained from the flash memory 17 or an external device of the game device 3 (e.g., via the Internet), instead of from the optical disc 4. A part of the game program 110 (e.g., a program for calculating the attitude of the controller 5 and/or the terminal device 7) may be pre-stored in the game device 3.

The terminal operation data 111 is data representing an operation performed by a player on the terminal device 7. The terminal operation data 111 is transmitted from the terminal device 7 to be received the game device 3, and is stored in the main memory. Note that the game device 3 is capable of communicating with a plurality of terminal devices, and is capable of obtaining operation data from the terminal devices. Where there are a plurality of terminal devices, the terminal operation data transmitted from the terminal devices are separately stored in the main memory. The main memory may store a predetermined number of latest (most recently obtained) sets of the terminal operation data for each terminal device.

The terminal operation data 111 includes angular velocity data, acceleration data, operation button data, stick data, touch position data, and azimuthal direction data. The angular velocity data is data representing the angular velocity detected by the gyrosensor 74. The acceleration data is data representing the acceleration (acceleration vector) detected by the acceleration sensor 73. The operation button data is data representing the input state of each of the operation buttons 54A to 54L provided on the terminal device 7. Specifically, the operation button data represents whether each of the operation buttons 54A to 54L is being pressed. The stick data is data representing the direction and the amount of slide (or tilt) of the stick portion of the analog stick 53 (the analog sticks 53A and 53B). The touch position data is data representing the position (touch position) on the input surface of the touch panel 52 at which an input is made. In the present embodiment, the touch position data represents coordinate values in a two-dimensional coordinate system for representing a position on the input surface. In a case in which the touch panel 52 is of a multi-touch type, the touch position data may represent a plurality of touch positions. The azimuthal direction data represents the azimuthal direction detected by the magnetic sensor 72.

The terminal operation data 111 may be data representing operations performed on the terminal device 7, and may be data including only one of the data included in the terminal operation data 111 in the present embodiment. Where the terminal device 7 includes another input mechanism (e.g., a touch pad, an image-capturing mechanism of the controller 5, etc.), the terminal operation data 111 may include data representing operations performed on the other input mechanism.

The controller operation data 112 is data representing an operation performed by the user (player) on the controller 5. The controller operation data 112 is transmitted from the controller 5 to be received by the game device 3, and is stored in the main memory. The controller operation data 112 includes data representing the detection results of the acceleration sensor 37 and the gyrosensor 48, data representing the input status of each of the operation buttons 32*a* to 32*i*, and data representing the marker coordinate point. In the present embodiment, three controller operation data 112 transmitted separately from three controllers 5 are separately stored in the main memory. The main memory may store a predetermined number of latest (most recently obtained) sets of the controller operation data for each of the three controllers 5.

Note that as long as the controller operation data 112 represents the operation of the user operating the controller 5, it may include only some of the data. In a case in which the controller 5 includes another input unit (e.g., a touch panel, an analog stick, or the like), the controller operation data 112 may include data representing the operation on the other input unit.

Figure 12:
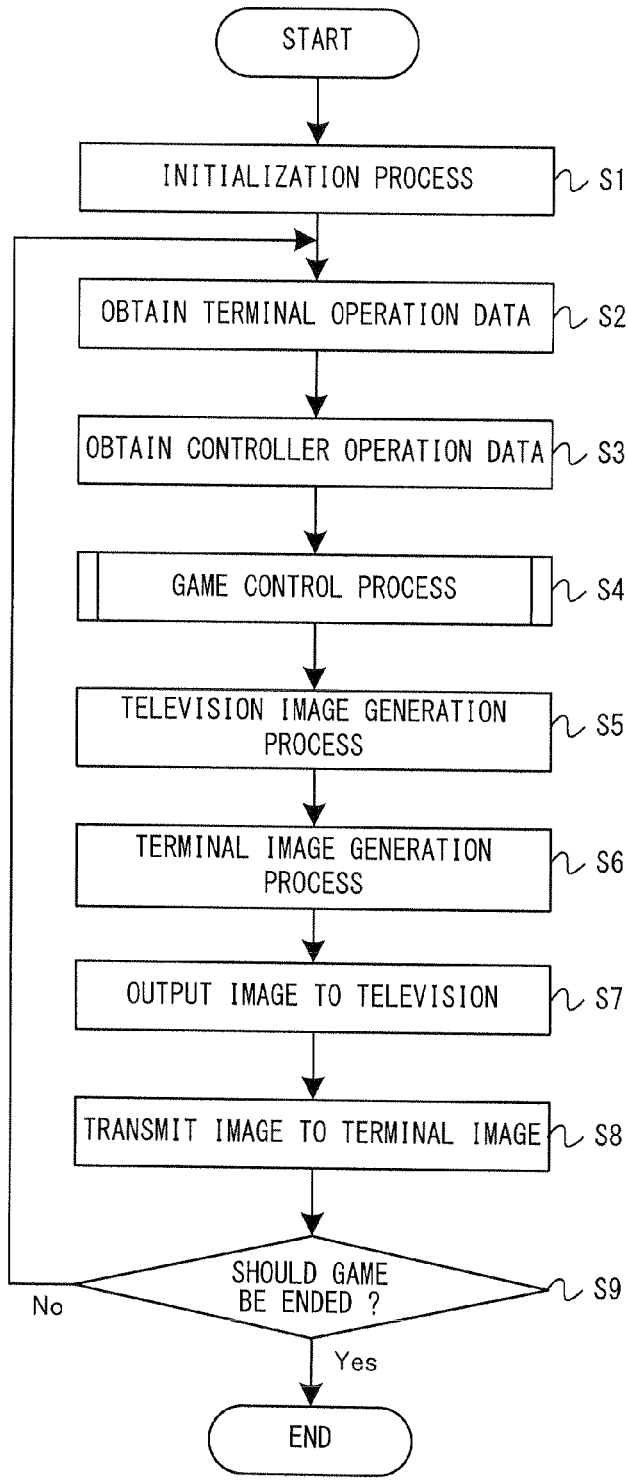
FIG. 12 a main flow chart showing an example of a flow of a game process executed in the game device 3.

The process data 113 is data used in game processes to be described below (FIG. 12). The process data 113 includes first object data 114, second object data 115, first camera data 116, second camera data 117, and display area data 118. Note that in addition to the data shown in FIG. 12, the process data 113 includes various data used in game processes such as data representing various parameters set for various objects appearing in the game.

The first object data 114 represents the position and the direction of the first object 101 in the game space. The second object data 115 represents the position and the direction of the second objects 102 to 104 in the game space. In the present embodiment, since there are a plurality (three) of the second objects 102 to 104, the second object data 115 is stored in the main memory separately for each second object.

The first camera data 116 represents the position and the attitude of the first virtual camera set in the game space for generating the terminal image. The second camera data 117 represents the position and the attitude of the second virtual camera set in the game space for generating the television image. In the present embodiment, a single second virtual camera is set in the game space.

The display area data 118 represents an area (referred to as the "display area") of the game space of which the image is taken by the second virtual camera. That is, the display area is an area of the game space displayed on the television 2. In the present embodiment, the display area represents an area on the plane (ground) in the game space on which the objects 101 to 104 are arranged.

Next, the details of the game processes performed by the game device 3 will be described with reference to FIGS. 12 to 18. FIG. 12 is a main flow chart showing an example of a flow of game processes performed by the game device 3. When the power of the game device 3 is turned ON, the CPU 10 of the game device 3 executes a boot program stored in a boot ROM (not shown), so as to initialize various units including the main memory. Then, the game program stored in the optical disc 4 is loaded to the main memory, and the CPU 10 starts executing the game program. FIG. 12 is a flow chart showing the process to be performed after processes described above are completed. The game device 3 may be configured to execute the game program immediately after power-up, or it may be configured so that a built-in program is executed after power-up for displaying a predetermined menu screen first, and then the game program is executed when the start of the game is instructed by the user by a menu selection, for example.

Figure 13:
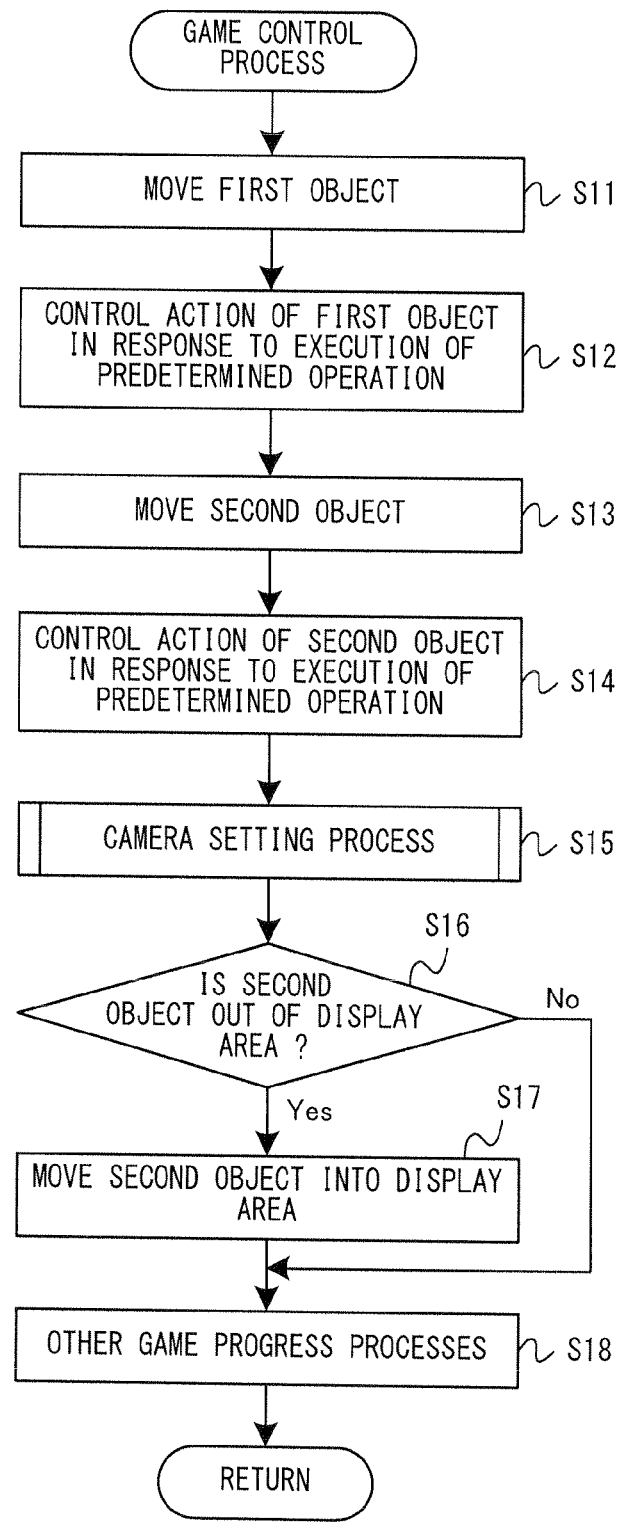
FIG. 13 is a flow chart showing an example of a detailed flow of a game control process (step S4) shown in FIG. 12.
Figure 15:
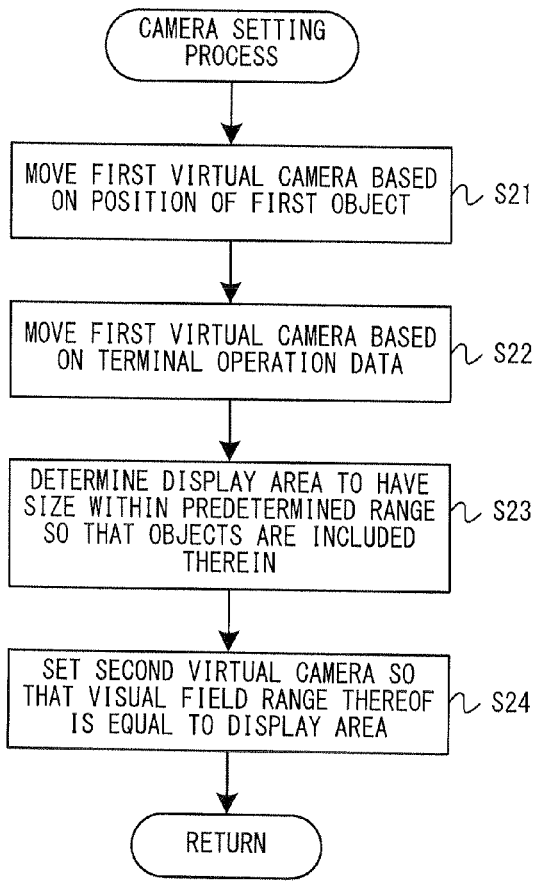
FIG. 15 is a flow chart showing an example of a detailed flow of a camera setting process (step S15) shown in FIG. 13.

Note that the process of the steps of the flow chart shown in FIGS. 12, 13 and 15 is merely illustrative, and the order of steps to be performed may be switched around as long as similar results are obtained. The values of the variables, and the threshold values used in determination steps are also merely illustrative, and other values may be used as necessary. While the present embodiment is described while assuming that the processes of the steps of the flow chart are performed by the CPU 10 of the game device 3, processes of some of the steps of the flow chart may be performed by a processor or a dedicated circuit other than the CPU 10.

First, in step S1, the CPU 10 performs an initialization process. The initialization process is a process of constructing a virtual game space, placing objects appearing in the game space at their initial positions, and setting initial values of various parameters used in the game processes. Note that in the present embodiment, the objects 101 to 105 are arranged at predetermined positions and in predetermined directions. That is, data representing the position and the direction of the first object 101 is stored in the main memory as the first object data 114, and data representing the position and the direction of the second objects 102 to 104 are stored in the main memory each as the second object data 115. Data representing the position and the direction of the enemy object 105 is stored in the main memory. Moreover, the first virtual camera is set so as to be at an initial position and in an initial attitude in accordance with the position and the direction of the first object 101. Data representing the initial position and the initial attitude of the first virtual camera is stored in the main memory as the first camera data 116. The second virtual camera is set so as to be at an initial position and in an initial attitude in accordance with the positions of the first and second objects 101 to 104. Data representing the initial position and the initial attitude of the second virtual camera is stored in the main memory as the second camera data 117.

The process of step S2 is performed, following step S1 described above. Thereafter, the process loop including a series of processes of steps S2 to S9 is repeatedly performed at a rate of once per a predetermined amount of time (one frame period, e.g., 1/60 sec).

In step S2, the CPU 10 obtains the terminal operation data transmitted from the terminal device 7. Since the terminal device 7 repeatedly transmits the terminal operation data to the game device 3, the terminal operation data is successively received by the game device 3. In the game device 3, the terminal communication module 28 successively receives the terminal operation data, and the input/output processor 11a successively stores the terminal operation data in the main memory. In step S2, the CPU 10 reads out the latest terminal operation data 111 from the main memory. The process of step S3 is performed, following step S2.

In step S3, the CPU 10 obtains controller operation data transmitted from each controller 5. Since each controller 5 repeatedly transmits the controller operation data to the game device 3, the controller communication module 19 of the game device 3 successively receives the controller operation data, and the received controller operation data is successively stored in the main memory by the input/output processor 11a. In step S2, the CPU 10 reads out the latest controller operation data 112 from the main memory for each controller 5. The process of step S4 is performed, following step S3.

In step S4, the CPU 10 performs the game control process. The game control process is a process for allowing the game to progress by, for example, performing processes such as controlling the action of each object in the game space in accordance with the game operation by each player. Specifically, in the game control process of the present embodiment, a process of controlling the movement of the objects 101 to 104, a process of controlling each virtual camera, etc., are performed. Now, with reference to FIG. 13, the game control process will be described.

FIG. 13 is a flow chart showing an example of the detailed flow of the game control process (step S4) shown in FIG. 12. In the game control process, first, in step S11, the CPU 10 controls the movement of the first object 101. The movement of the first object 101 may be controlled in any manner as long as it is controlled based on the operation (the terminal operation data 111) performed on the terminal device 7. In the present embodiment, the CPU 10 calculates the position of the first object 101 after the move in accordance with the direction input made on the analog stick 53A or 53B. For example, the first object 101 is moved in a direction in accordance with the direction in which the analog stick 53A or 53B is operated by an amount of movement in accordance with the amount by which the analog stick 53A or 53B is operated. The CPU 10 may also calculate the position of the first object 101 after the move in accordance with the input (touch input) made on the touch panel 52. For example, the first object 101 move in a direction from the current position toward the position in the game space specified by a touch input.

As a specific process of step S11, the CPU 10 reads out, from the main memory, the first object data 114 representing the position and the direction of the first object 101 before the first object 101 is moved, and calculates the position and the direction after the move based on the position and the direction before the move and the terminal operation data 111 read out in step S2. Then, the calculated position and direction after the move are stored in the main memory as new first object data 114. The process of step S12 is performed, following step S11.

In step S12, the CPU 10 makes the first object 101 execute a predetermined action in response to a predetermined operation on the terminal device 7. The predetermined operation may be any operation, and it is in the present embodiment an operation of specifying a position in the game space using the touch panel 52. The predetermined action may be any action, and may be, for example, an action of throwing an object (an item or another object) or an action of changing parameters of other objects (specifically, an action of attacking an enemy object or an action of recovering an object of the player's party).

Figure 14:
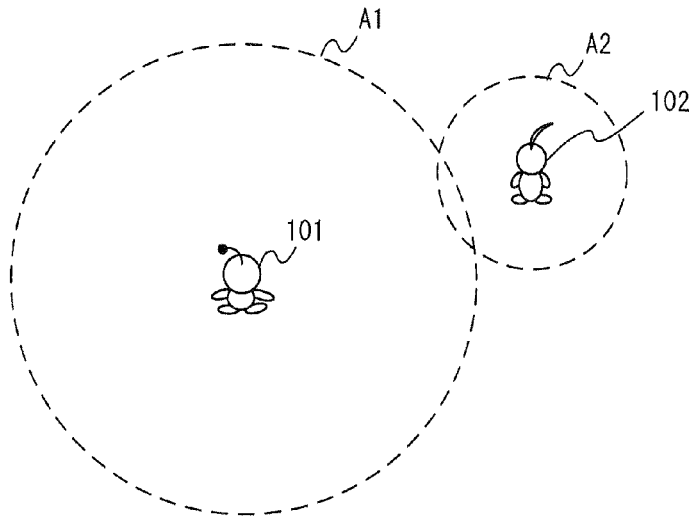
FIG. 14 is a diagram showing an example of ranges of effect of actions executed by first and second objects.

FIG. 14 is a diagram showing an example of an effect range of the action by the first and second objects. In FIG. 14, the dotted area A1 represents the effect range of the predetermined action by the first object 101. Herein, the effect range of an action is a range over which the action can influence the game space or objects arranged in the game space. The position of the effect range is based on the position of the first object 101. In the present embodiment, the effect range is a circular area centered about the position of the first object 101.

As a specific process of step S12, the CPU 10 determines whether the predetermined operation has been performed based on the terminal operation data 111 read out in step S2. If the predetermined operation has been performed, the CPU 10 calculates parameters representing an action of the first object 101 so as to make the first object 101 execute the predetermined action, and stores data of the calculated parameters in the main memory. On the other hand, if the predetermined operation has not been performed, the CPU 10 does not perform the process of making the first object 101 execute the predetermined action. The process of step S13 is performed, following step S12.

In step S13, the CPU 10 controls the movement of each of the second objects 102 to 104. The movement of a second object may be controlled in any manner as long as it is controlled based on the operation (the controller operation data 112) performed on the controller 5 associated with the second object. In the present embodiment, the CPU 10 calculates the position of the second object after the move in accordance with a direction input on the cross button 32a. For example, the second object is moved by a predetermined amount in a direction in accordance with the direction in which the cross button 32a is operated.

As a specific process of step S13, the CPU 10 reads out, from the main memory, the second object data 115 representing the position and the direction of the second object before the move, and calculates the position and the direction after the move based on the position and the direction before the move and the controller operation data 112 read out in step S3. Then, the calculated position and direction after the move are stored in the main memory as new second object data 115. The CPU 10 performs, for each second object, the process of calculating the position and the direction after the move and storing the new second object data 115. The process of step S14 is performed, following step S13.

In step S14, the CPU 10 makes the second object execute a predetermined action in response to a predetermined operation on the controller 5. The predetermined operation may be any operation, and it is in the present embodiment an operation of pressing a predetermined button of the controller 5. The predetermined action may be any action. In the present embodiment, the predetermined action is an action having an effect of the same kind as the predetermined action described above executed by the first object 101. For example, if the predetermined action by the first object 101 is an action of attacking an enemy object, the predetermined action by the second object is also an action of attacking an enemy object. Note however that the predetermined action by the first object 101 and the predetermined action by the second object do not have to be exactly the same, and specific methods of attack (whether or not to use a weapon for an attack) may differ therebetween.

In FIG. 14, the dotted area A2 represents the effect range of the predetermined action by the second object 102. In the present embodiment, the effect range is a circular area centered about the position of the second object 102. As shown in FIG. 14, in the present embodiment, the effect range of the predetermined action by the second object 102 (this similarly applies also to other second objects) is smaller than the effect range of the predetermined action by the first object 101.

As a specific process of step S14 the CPU 10 determines whether the predetermined operation has been performed based on the controller operation data 112 read out in step S3. Where the predetermined operation has been performed, the CPU 10 calculates parameters representing an action of a second object that is associated with the controller 5 on which the predetermined operation has been performed so as to make the second object execute the predetermined action, and stores data of the calculated parameters in the main memory. On the other hand, if the predetermined operation has not been performed, the CPU 10 does not perform the process of making the second object execute the predetermined action. The CPU 10 performs the process described above for each of the second objects 102 to 104. The process of step S15 is performed, following step S14 described above.

As described above, in the present embodiment, the CPU 10 can make the first object 101 execute a predetermined action that influences a predetermined range around the first object 101 (step S12). The CPU 10 can also make a second object execute an action that imparts an effect of the same kind as the predetermined action by the first object 101 (step S14). Herein, the predetermined action by the second object has an influence across a range around the second object that is smaller than the predetermined range (the effect range of the predetermined action by the first object 101) (see FIG. 14). In the present embodiment, the first object 101 and the second objects 102 to 104 have different capabilities from each other. Therefore, each player is required to perform game operations suitable for the capabilities of the object the player is controlling, thereby improving the strategic aspect of the game.

In the present embodiment, the terminal device 7 includes the touch panel 52 provided on the screen of a display unit (the LCD 51), and the CPU 10 controls the first object 101 (moves the first object 101 or makes the first object 101 execute a predetermined action) based on an input made on the touch panel 52. Moreover, the CPU 10 controls the second objects 102 to 104 based on inputs made on operation buttons provided on the controller 5. Therefore, the first player can perform intuitive and easy game operations using the touch panel 52. In the present embodiment, where the first object 101 executes an action with a relatively wide effect range, if the CPU 10 controls the action based on an input made on the touch panel 52, the first player can make the first object 101 execute the action through an easy operation. On the other hand, for the control of the second objects, if each second player is allowed to perform an operation of specifying a position on the screen of the television 2, the operation will be difficult to perform since a plurality of people may be specifying positions on a single screen at the same time. In contrast, second players can easily control second objects without performing an operation of specifying a position on the screen of the television 2.

In step S15, the CPU 10 performs the camera setting process. The camera setting process is a process of setting each virtual camera in the game space based on the positions of the first and second objects 101 to 104, etc. The details of the camera setting process will now be described with reference to FIG. 15.

FIG. 15 is a flow chart showing an example of the detailed flow of the camera setting process (step S15) shown in FIG. 13. In the camera setting process, first, in steps S21 and S22, the first virtual camera is set. In the present embodiment, the first virtual camera is controlled based on the position of the first object 101 (step S21), and is also controlled based on an operation performed on the terminal device 7 (step S22).

In step S21, the CPU 10 sets the first virtual camera based on the position of the first object 101. The specific method for setting the position and the attitude of the first virtual camera may be any method. In the present embodiment, the position of the first virtual camera is set to a position that is spaced apart from the position of the first object 101 in a predetermined direction by a predetermined distance. The predetermined direction may be determined in any manner, and the predetermined direction varies in the present embodiment in accordance with the operation performed on the terminal device 7 in step S22 to be described later. Therefore, in step S21, the predetermined direction is set to the previous direction (the predetermined direction calculated through the previous iteration of the process loop of steps S2 to S9). Note that in other embodiments, the predetermined direction may be a direction determined in advance, or may be determined in accordance with the direction and/or the moving direction of the first object 101 so that the direction is such that the first object 101 is seen from behind, for example. Alternatively, for example, the predetermined direction may be determined in accordance with the direction from the first object 101 to a particular object (e.g., the enemy object 105). Thus, it is possible to generate a game image such that a particular object is being the focus of attention. The attitude of the first virtual camera is set so as to face the direction of the first object 101 (specifically, the opposite direction to the predetermined direction). Then, an image generated by the first virtual camera is an image of the game space as seen in so-called "third-person perspective" and is an image including the first object 101 therein. Note that in other embodiments, the position of the first virtual camera may be set at the position of the first object 101. Then, an image generated by the first virtual camera is an image of the game space as seen in so-called "first-person perspective" and is an image of the game space as seen from the position of the first object 101.

Figure 16:
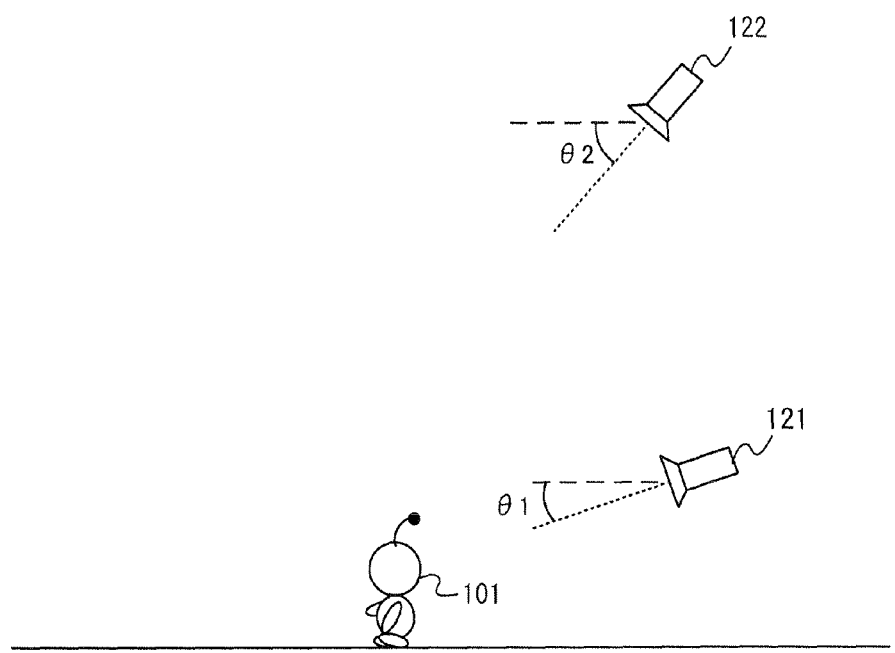
FIG. 16 is a diagram showing an example of a method for setting each virtual camera.

FIG. 16 is a diagram showing an example of a method for setting each virtual camera. As shown in FIG. 16, in the present embodiment, a first virtual camera 121 is set so as to have an angle of depression θ1 that is smaller than the angle of depression θ2 of a second virtual camera 122. The position of the first virtual camera 121 is set to a position slightly above the first object 101. The viewing direction (shooting direction) of the first virtual camera 121 is such a direction that the first object 101 is seen from slightly above. Note that the angle of depression θ1 may be 0° or a negative value. That is, the viewing direction of the first virtual camera 121 may be parallel to the ground or may be set to be slightly upward. While the present embodiment is directed to the third-person perspective example described above, the angle of depression θ1 can be set to a positive value smaller than the angle of depression θ2 of the second virtual camera 122, or set to 0° or a negative value also in the case of first-person perspective.

As a specific process of step S21, the CPU 10 reads out the first object data 114 from the main memory, and calculates the position and the attitude of the first virtual camera 121 based on the first object data 114. Note that in the present embodiment, in step S21, the attitude of the first virtual camera 121 does not change (the previous value is retained). The CPU 10 stores data of the calculated position and attitude in the main memory as the first camera data 116. The process of step S22 is performed, following step S21 described above.

In step S22, the CPU 10 changes the direction (attitude) of the first virtual camera 121 in accordance with a predetermined rotation operation performed on the terminal device 7. In the present embodiment, the direction of the first virtual camera 121 changes in accordance with a rotation operation so that the first virtual camera 121 rotates at least about an axis perpendicular to the ground. More specifically, if a rotation operation has been performed on the terminal device 7, the first virtual camera 121 rotates about an axis centered about the first object 101 and perpendicular to the ground with the angle of depression θ1 kept unchanged. Note that while the position and the attitude of the first virtual camera 121 change in response to a rotation operation in the case of third-person perspective as in the present embodiment, only the attitude of the first virtual camera 121 may be changed in the case of first-person perspective. The rotation operation may be any operation, and it may be, for example, an input operation performed on the touch panel 52 or an operation of pressing a predetermined button of the terminal device 7 (e.g., the cross button 54A, the first L button 54I, or the first R button 54J). Note that in other embodiments, the first virtual camera 121 may be rotatable also about another axis in addition to the rotation about the axis perpendicular to the ground.

As a specific process of step S22, the CPU 10 determines whether the rotation operation has been performed based on the terminal operation data 111 read out in step S2. If the rotation operation has been performed, the CPU 10 reads out the first camera data 116 from the main memory, and calculates the position and the attitude of the first virtual camera 121 after the move. Then, data representing the calculated position and attitude is stored in the main memory as new first camera data 116. On the other hand, if the rotation operation has not been performed, the CPU 10 does not perform the process of calculating the first camera data 116. The process of step S23 is performed, following step S22 described above.

In steps S23 and S24, the second virtual camera is set. In the present embodiment, the second virtual camera moves in accordance with the positions of the objects (the first object 101 and the second objects 102 to 104) so that the display area, which is determined based on the positions of the objects, is included in the visual field range.

Figure 17:
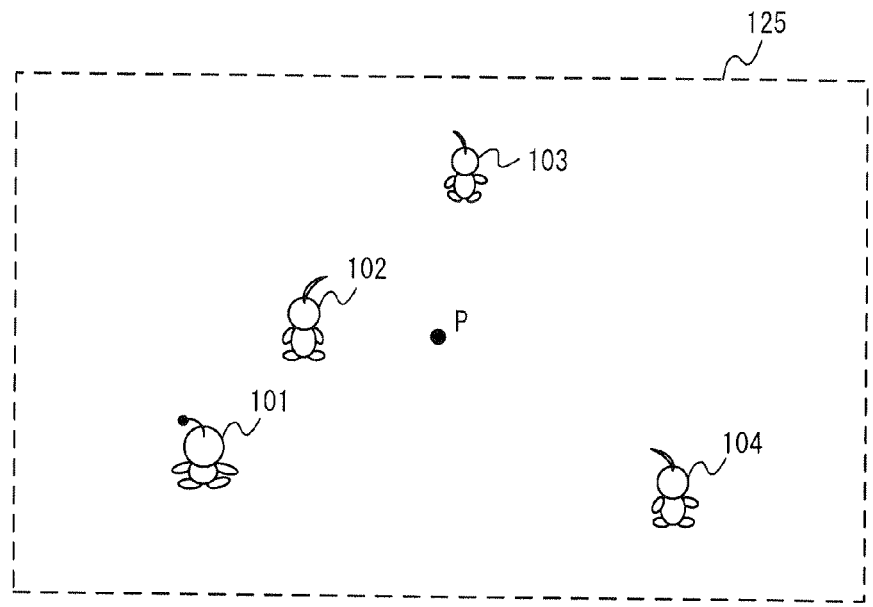
FIG. 17 is a diagram showing an example of a display area set in a game space.

In step S23, the CPU 10 determines the display area based on the positions of the objects 101 to 104. FIG. 17 is a diagram showing an example of the display area set in the game space. As shown in FIG. 17, a display area 125 is determined so that the objects (the first object 101 and the second objects 102 to 104) are included within the display area 125. Note however that in the present embodiment, the display area 125 is determined on a condition that the display area 125 has a size within a predetermined range. That is, the CPU 10 sets the display area 125, the size of which is limited to be within the predetermined range, so that the objects 101 to 104 are included therein as much as possible.

The specific method for determining the display area 125 may be any method. In the present embodiment, the CPU 10 first calculates the center position P between the objects 101 to 104. For example, the center position P can be calculated as the average between the position coordinates of the objects 101 to 104. Then, the CPU 10 arranges the display area 125 centered about the center position P, and adjusts the size of the display area 125 so that the objects 101 to 104 are included within the display area 125 as much as possible. Note that the size of the display area 125 may be adjusted only when at least one of the objects 101 to 104 has moved out of the currently-set display area (the display area determined in step S23 in the previous iteration) 125. In a case where not all of the objects 101 to 104 are included even if the size of the display area 125 is set to the maximum size within the predetermined range, the CPU 10 sets the display area 125 to the maximum size. More specifically, the CPU 10 tentatively sets the size of the display area 125 so that one of the objects 101 to 104 that is farthest away from the center position P will be position along the periphery of the display area 125. Then, if the tentatively-set size is less than or equal to the maximum size described above, the CPU 10 sets the display area 125 to the tentatively-set size, and if the tentatively-set size exceeds the maximum size, the CPU 10 sets the display area 125 to the maximum size. In other embodiments, the CPU 10 may tentatively set the display area 125 so that the object farthest away from the center position P is located inside the periphery of the display area 125 by a predetermined distance or more. Then, it is possible to prevent an object from becoming difficult to see for the player as it is arranged at the edge of the game image and displayed at the edge of the screen.

Figure 18:
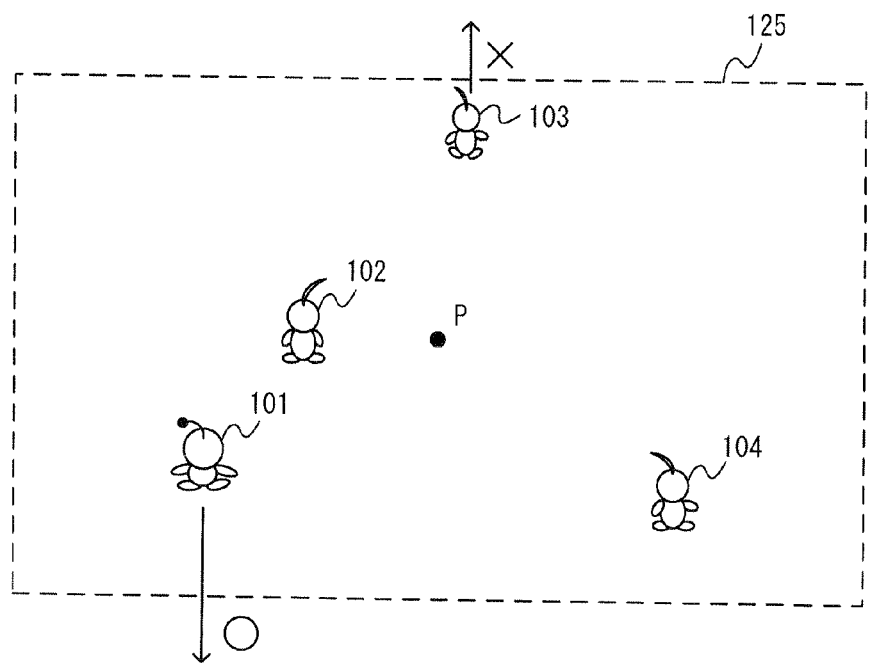
FIG. 18 is a diagram showing an example of movements of objects out of the visual field range of a second virtual camera.

Note that while the display area 125 is rectangular in FIGS. 17 and 18, the shape of the display area 125 is not limited to rectangular. For example, the display area 125 may be trapezoidal depending on the game image generating method.

As a specific process of step S23, the CPU 10 reads out the object data 114 and 115 from the main memory, and calculates the position and the size of the display area 125 by the method described above, for example, based on the read-out data. Then, data representing the calculated position and size is stored in the main memory as the display area data 118. The process of step S24 is performed, following step S23 described above.

In step S24, the CPU 10 sets the second virtual camera based on the display area 125. The second virtual camera is set so that the game space in the display area 125 is displayed on the television 2, i.e., so that the display area 125 is included in the visual field range. Specifically, the CPU 10 sets the second virtual camera so that the display area 125 and the visual field range coincide with each other.

As shown in FIG. 16, in the present embodiment, the second virtual camera 122 is set so that the angle of depression θ2 with respect to the ground is larger than the angle of depression θ1 of the first virtual camera 121. In FIG. 16, the second virtual camera 122 is arranged at a higher position than the first virtual camera 121. In the present embodiment, the second virtual camera 122 is set so as to see (capture an image of) the game space from an eye level above that of the first virtual camera 121.

As a specific process of step S24, the CPU 10 reads out the display area data 118 from the main memory, and calculates the position and the attitude of the second virtual camera by the method described above, for example, based on the read-out data. Then, data representing the calculated position and attitude is stored in the main memory as the second camera data 117. The CPU 10 ends the camera setting process after step S24.

Through the process of steps S23 and S24, the second virtual camera 122 is set. With the process of steps S23 and S24 described above, the maximum size of the display area 125 is set, whereby the visual field range of the second virtual camera 122 can be limited within a predetermined range. Thus, it is possible to prevent the objects 101 to 104 displayed on the television 2 from becoming difficult to see for the players as the range of the game space displayed on the television 2 is excessively large (as the visual field range of the second virtual camera 122 is excessively large). Note that in other embodiments, the CPU 10 may set the maximum size and the minimum size of the visual field range of the second virtual camera 122. Then, it is possible to prevent the objects 101 to 104 displayed on the television 2 from becoming difficult to see for the players as the range of the game space displayed on the television 2 is excessively small (as the visual field range of the second virtual camera 122 is excessively small).

Note that in the present embodiment, the second virtual camera 122 is set so that the first object 101 and the second objects 102 to 104 are included in the visual field range of the second virtual camera 122 (so that they are displayed on the television 2). In other embodiments, the second virtual camera 122 may be set so that the second objects 102 to 104 are included in the visual field range. The CPU 10 may determine whether or not to set the second virtual camera 122 so as to include the first object 101 within the visual field range, depending on the game status such as the game scene.

With the camera setting process described above, the CPU 10 sets the direction of the second virtual camera so that the angle of depression thereof with respect to the predetermined plane (ground) on which the second objects 102 to 104 can move around in the game space is greater than the angle of depression of the first virtual camera. Then, since the television image is a game image of the game space as seen from a (relatively) upward direction, it is possible to reduce the possibility that the plurality of second objects 102 to 104 arranged on the predetermined plane are displayed lying on one another, whereby it is possible to display the second objects 102 to 104 in an easier-to-view manner. On the other hand, since the terminal image is a game image of the game space as seen from a relatively horizontal direction, the first player can see the game space from a viewing direction close to the eye level of the object, and can therefore play the game while looking at a more dynamic game image. Moreover, since the terminal image is an image of the game space as seen from a horizontal direction, it is easier for the first player to grasp the positional relationship with respect to the height direction (the direction perpendicular to the ground). Note that since it is not so necessary for the second players to see the terminal image, it will not be a problem if the second objects 102 to 104 are displayed while lying on one another on the screen. As described above, in the present embodiment, the angle of depression of the second virtual camera 122 is set to be larger than the angle of depression of the first virtual camera 121, whereby the television image to be viewed by the second players can be made easy to see for the second players, and the terminal image to be viewed by the first player can be made easy to see for the first player.

With the process of step S22 described above, the CPU 10 changes the direction of the first virtual camera 121 about an axis perpendicular to the predetermined plane (ground) in accordance with an operation performed on the terminal device 7. Note that where the angle of depression of the first virtual camera 121 is set to be relatively small, it may be difficult to evenly display the area around the first object 101 (e.g., the area behind the first object 101 may not be displayed). In contrast, in the present embodiment, since the first player can change the direction of the first virtual camera 121, it is possible to easily grasp the area around the first object 101 by directing the first virtual camera 121 in an intended direction. Since it is not so necessary for the second players to see the terminal image, it will not be a problem for the second players even if the viewing direction of the terminal image is changed freely by the first player. That is, with the process of step S22 described above, it is possible to provide a game image that is easy-to-view for the first player without causing inconvenience to the second players.

Referring back to the game control process shown in FIG. 13, in step S16 following step S15, the CPU 10 determines whether at least one of the second objects 102 to 104 is located outside the visual field range of the second virtual camera 122 (the display area 125). For example, the CPU 10 reads out the second object data 115 and the second camera data 117 (or the display area data 118) from the main memory, and makes the determination of step S16 based on the read-out data. If the determination result of step S16 is affirmative, the process of step S17 is performed. On the other hand, if the determination result of step S16 is negative, the process of step S18 is performed, skipping the process of step S17.

In step S17, the CPU 10 moves the second object located outside the visual field range of the second virtual camera 122 (the display area 125) to a position within the visual field range. The position of the second object after the move may be a position in the vicinity of the periphery of the visual field range (a position slightly inside of the periphery) or may be a predetermined position within the visual field range (e.g., the central position of the visual field range or the position of the first object 101). That is, any second object that is about to move out of the visual field range may be controlled to be located at the edge of the visual field range or may be controlled (forcibly by the CPU 10) to be moved to the central position of the visual field range. Specifically, in step S16, the CPU 10 reads out the second object data 115 for the second object that is determined as being outside the visual field range from the main memory, and changes the position of the second object to a position within the visual field range. Data representing the changed position is stored in the main memory as new second object data 115. The process of step S18 is performed, following step S17 described above.

FIG. 18 is a diagram showing an example of movements of objects out of the visual field range of the second virtual camera. With the process of steps S16 and S17 described above, when any of the second objects 102 to 104 is about to move out of the visual field range of the second virtual camera 122, the CPU 10 corrects the position of the second object to a position within the visual field range. Therefore, as shown in FIG. 18, the second objects 102 to 104 will always be located within the visual field range of the second virtual camera 122. On the other hand, since the first object 101 is not subjected to the process of steps S16 and S17 described above, the first object 101 is allowed to move outside the visual field range in accordance with an operation by the first player as shown in FIG. 18. That is, the CPU 10 allows the first object 101 to move out of the visual field range (does not perform the process of step S17 for the first object 101) if the visual field range of the second virtual camera 122 has reached its limit. Therefore, the first object 101 can possibly be located outside the visual field range.

As described above, in the present embodiment, the CPU 10 sets the second virtual camera 122, wherein a predetermined size is defined as the upper limit of the visual field range of the second virtual camera 122 (steps S23 and S24). That is, the second virtual camera 122 is set within a predetermined setting range so that the size of the visual field range of the second virtual camera 122 does not exceed a predetermined size. When the visual field range of the second virtual camera 122 is equal to the upper limit (the maximum size), the CPU 10 controls the second objects 102 to 104 so as not to move out of the visual field range. The CPU 10 moves the first object 101 in accordance with an operation performed on the terminal device 7, independently of the visual field range of the second virtual camera 122 (steps S16 and S17). In other words, when the setting of the second virtual camera 122 reaches the upper limit of the setting range, the CPU 10 controls the second objects 102 to 104 so as not to move out of the visual field range of the second virtual camera 122 while allowing the first object 101 to move out of the visual field range of the second virtual camera 122.

Therefore, in the present embodiment, the second objects 102 to 104 are always displayed on the television 2, whereas the first object 101 may disappear from the television 2. Since the second objects 102 to 104 are always displayed on the television 2, the second players, who play the game while mainly looking at the television 2, can play the game comfortably without losing sight of their own control objects.

On the other hand, the first player plays the game while looking at the terminal device 7 and is not playing the game while always looking at the television 2, whereby it is difficult for the first player to check whether the first object 101 has moved out of the display range of the television 2 (the visual field range of the second virtual camera). Therefore, if the first object 101 is controlled so as not to move out of the visual field range, as are the second objects 102 to 104, the first player may feel awkward about the controllability when the first object 101 moves against the intention of the first player. Since the first player can play the game while looking at the terminal image, the first player will not lose sight of its own control object even if the first object 101 disappears from the television 2. Thus, in the present embodiment, by allowing the first object 101 to move out of the visual field range, it is possible to prevent the first object 101 from moving against the first player's intention while the first player can comfortably control the first object 101 without feeling awkward.

Note that in other embodiments, while the first object 101 is located outside the visual field range of the second virtual camera, the CPU 10 may generate a television game image including a direction image, which indicates the direction from the visual field range toward the first object 101. The direction image may be, for example, an arrow pointing toward the first object 101. For example, the direction image may be displayed in the vicinity of the intersection between the straight line extending from the center of the television image to the first object 101 and the periphery of the television image. Specifically, the CPU 10 determines whether the first object 101 is located outside the visual field range of the second virtual camera 122 by a method similar to that of step S16 described above. Then, if it is determined that the first object 101 is located outside the visual field range, a game image in which the direction image is laid over the television game image generated in step S5 to be described later is generated and displayed on the television 2. Then, even if the first object 101 disappears from the television 2, the players can generally know the positional relationship between the display range of the television 2 and the first object 101.

In step S18, the CPU 10 performs other game progress processes. Other game progress processes are those performed in the game control process of step S4, other than the processes of steps S11 to S17. The other game progress processes include, for example, a process of controlling the action of objects other than the object controlled by a player, a process relating to items arranged in the game space, etc. Processes for allowing the game to progress, other than those described above are performed in step S18 as necessary. The CPU 10 ends the game control process after step S18.

Referring back to FIG. 12, the process of step S5 is performed, following the game control process of step S4. In step S5, the television image is generated. That is, the CPU 10 and the GPU 11b read out data representing the results of the game control process of step S4 (the object data 114 and 115, etc.) from the main memory, and read out data (image data, etc.) used for generating the game image from the VRAM 11d. Then, the television image is generated based on the read-out data. In the present embodiment, the second virtual camera is set so as to have a relatively large angle of depression θ2. Thus, a television image is generated representing the game space as seen from a viewing direction that is closer to the vertically downward direction (see FIG. 9). The generated television image is stored in the VRAM 11d. The process of step S6 is performed, following step S5 described above.

In step S6, the terminal image is generated based on the game control process described above. That is, the CPU 10 and the GPU 11b read out data representing the results of the game control process of step S4 from the main memory, and read out data used for generating the game image from the VRAM 11d. Then, the terminal image is generated based on the read-out data. In the present embodiment, the first virtual camera is set to have a relatively small angle of depression θ1. Therefore, a terminal image is generated, representing the game space as seen from a viewing direction that is closer to the horizontal direction (see FIG. 10). The generated terminal image is stored in the VRAM 11d. The process of step S7 is performed, following step S6 described above.

In step S7, the CPU 10 outputs the game image to the television 2. Specifically, the CPU 10 sends data of the television image stored in the VRAM 11d to the AV-IC 15. In response to this, the AV-IC 15 outputs data of the television image to the television 2 via the AV connector 16. Thus, the television image is displayed on the television 2. Where the game sound generated in the game device 3 is output to the television 2, the CPU 10 sends the generated sound data to the AV-IC 15. In response to this, the AV-IC 15 outputs the sound data to the television 2 via the AV connector 16. Thus, the television game sound is output from the speaker 2a. The process of step S8 is performed, following step S7 described above.

In step S8, the CPU 10 outputs (transmits) the game image to the terminal device 7. Specifically, the image data of the terminal image stored in the VRAM 11d is sent to the codec LSI 27 by the CPU 10, and a predetermined compression process is performed by the codec LSI 27. The compressed image data is transmitted to the terminal device 7 by the terminal communication module 28 via the antenna 29. The terminal device 7 receives image data transmitted from the game device 3 by means of the wireless module 80, and a predetermined expansion process is performed on the received image data by the codec LSI 76. The expanded image data is output to the LCD 51. Thus, the terminal image is displayed on the LCD 51. Where the sound generated in the game device 3 is output to the terminal device 7, the generated sound data is sent to the codec LSI 27 by the CPU 10, and a predetermined compression process is performed by the codec LSI 27. Then, the compressed sound data is transmitted by the terminal communication module 28 to the terminal device 7 via the antenna 29. The terminal device 7 receives sound data transmitted from the game device 3 by means of the wireless module 80, and a predetermined expansion process is performed by the codec LSI 76. The expanded sound data is output to the sound IC 78. Thus, the terminal game sound is output from the speaker 77. The process of step S9 is performed, following step S8 described above.

In step S9, the CPU 10 determines whether or not to end the game. The determination of step S9 is made based on, for example, whether the player has given an instruction to quit the game, whether the game is over, etc. If the determination result of step S9 is negative, the process of step S2 is performed again. On the other hand, if the determination result of step S9 is affirmative, the CPU 10 ends the game process shown in FIG. 16. Note that if the game process is ended, a process of saving the game data on a memory card, etc. may be performed, for example. Thereafter, the series of processes of steps S2 to S9 is repeatedly performed until it is determined in step S9 that the game should be ended.

As described above, in the present embodiment, a single game image is displayed, including the control objects (objects) of the players who are playing the game using the terminal device 7 and the controllers 5. Thus, the players playing the game on the game system 1 can feel the sense of unity in the game.

[7. Variations]

The embodiment above is illustrative, and the game system, the game device, the game program and the game process method can be implemented with the following configurations, for example, in other embodiments.

(Variation Regarding Information Processing Device Performing Game Process)

While a series of game processes of the game system 1 is performed by the game device 3 in the embodiment above, some of the game processes may be performed by another device. For example, in other embodiments, some or all of the game processes (e.g., the process of generating the terminal image) may be performed by the terminal device 7. Note that where all of the game processes are performed by the terminal device 7, the game system 1 may not include the game device 3, wherein the terminal device 7 and the controllers 5 directly communicate with each other. In other embodiments, in an information processing system that includes a plurality of information processing devices that can communicate with each other, the game processes may be divided among the plurality of information processing devices.

Where information processes are performed by a plurality of information processing devices, the information processes will be complicated because processes to be performed by different information processing devices are synchronized together. In contrast, where information processes are performed by a single game device 3, wherein the terminal device 7 is responsible for the process of receiving and displaying images, as in the game examples above (i.e., where the terminal device 7 or a hand-held device 9 functions as a thin client terminal), there is no need to synchronize the information processes between a plurality of information processing devices, and it is therefore possible to simplify the information processes.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

As described above, the present embodiment can be applicable to a game system, a game device, a game program, a game process method, etc., for example, with the aim of allowing a plurality of players playing a game to feel the sense of unity.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game system having a terminal device including an operation unit and a first display unit, and a plurality of controller devices, the game system comprising:
a first control unit for moving a first object, which is arranged in a predetermined game space, in accordance with an operation performed on the terminal device;
a second control unit for moving second objects in the game space in accordance with operations performed on the controller devices, wherein the number of second objects arranged in the game space is determined based on the number of controller devices and each second object is associated with one of the controller devices;
a first camera setting unit for setting a first virtual camera based on a position of the first object in the game space;
a second camera setting unit for repeatedly setting position and attitude of a second virtual camera based on positions of the second objects so that a plurality of the moving second objects in the game space are included in a visual field range;
a first display control unit for displaying, on the first display unit, a first game image representing the game space as seen from the first virtual camera; and
a second display control unit for displaying, on a predetermined display device separate from the terminal device, a second game image representing the game space as seen from the second virtual camera, wherein
the second camera setting unit sets an orientation of the second virtual camera so that an angle of depression of the second virtual camera with respect to a predetermined plane, on which the second objects can be moved in the game space, is greater than that of the first virtual camera.

2. The game system according to claim 1, wherein
the second camera setting unit sets the second virtual camera based on positions of the first object and the plurality of second objects so that the first object and the plurality of second objects in the game space are included in the visual field range.

3. The game system according to claim 2, wherein:
the second camera setting unit sets the second virtual camera, wherein the visual field range of the second virtual camera has a predetermined upper limit;
the second control unit controls the second objects so as not to move out of the visual field range when the visual field range of the second virtual camera is equal to the upper limit; and
the first control unit moves the first object in accordance with an operation performed on the terminal device, independently of the visual field range of the second virtual camera.

4. The game system according to claim 1, wherein
the first camera setting unit changes an orientation of the first virtual camera about an axis perpendicular to the predetermined plane in accordance with an operation performed on the terminal device.

5. The game system according to claim 1, wherein
the game image representing the game space is not displayed on the controller device.

6. The game system according to claim 1, wherein
the controller device includes a second display unit for displaying a sub-game image used as a supplement to the second game image.

7. The game system according to claim 1, wherein:
the first control unit is configured to make the first object execute a predetermined action that imparts an effect across a predetermined range around the first object; and
the second control unit is configured to make the second object execute an action that imparts an effect of the same kind as the predetermined action across a range around the second object that is smaller than the predetermined range.

8. The game system according to claim 7, wherein
the terminal device further includes a touch panel provided on a screen of the first display unit;
the first control unit controls the first object based on an input made on the touch panel; and the second control unit controls the second object based on an input made on an operation button provided on the controller device.

9. The game system according to claim 1, wherein:
the terminal device further includes a touch panel provided on a screen of the first display unit;
the first control unit controls the first object based on an input made on the touch panel; and
the second control unit controls the second object based on an input made on an operation button provided on the controller device.

10. A game device capable of communicating with a terminal device including an operation unit and a display unit, and a plurality of controller devices, the game device comprising:
a first control unit for moving a first object, which is arranged in a predetermined game space, in accordance with an operation performed on the terminal device;
a second control unit for moving second objects in the game space in accordance with operations performed on the controller devices, wherein the number of second objects arranged in the game space is determined based on the number of controller devices and each second object is associated with one of the controller devices;
a first camera setting unit for setting a first virtual camera based on a position of the first object in the game space;
a second camera setting unit for repeatedly setting position and attitude of a second virtual camera based on positions of the second objects so that a plurality of the moving second objects in the game space are included in a visual field range;
a first image output unit for outputting, to the terminal device, a first game image representing the game space as seen from the first virtual camera; and
a second image output unit for outputting, a predetermined display device separate from the display unit, a second game image representing the game space as seen from the second virtual camera, wherein
the second camera setting unit sets an orientation of the second virtual camera so that an angle of depression of the second virtual camera with respect to a predetermined plane, on which the second objects can be moved in the game space, is greater than that of the first virtual camera.

11. A non-transitory computer-readable storage medium storing a game program to be executed by a computer of a game device, which is capable of communicating with a terminal device including an operation unit and a display unit, and a plurality of controller devices,
the game program causing the computer to execute:
moving a first object, which is arranged in a predetermined game space, in accordance with an operation performed on the terminal device;
moving second objects in the game space in accordance with operations performed on the controller devices, wherein the number of second objects arranged in the game space is determined based on the number of controller devices and each second object is associated with one of the controller devices;
setting a first virtual camera based on a position of the first object in the game space;
repeatedly setting position and attitude of a second virtual camera based on positions of the second objects so that a plurality of the moving second objects in the game space are included in a visual field range;
generating a first game image which is a game image displayed on the terminal device and which represents the game space as seen from the first virtual camera; and
generating a second game image which is a game image displayed on a predetermined display device separate from the display unit and which represents the game space as seen from the second virtual camera, wherein
the second camera setting sets an orientation of the second virtual camera so that an angle of depression of the second virtual camera with respect to a predetermined plane, on which the second objects can be moved in the game space, is greater than that of the first virtual camera.

12. A game process method to be executed in a game system having a terminal device including an operation unit and a first display unit, and a plurality of controller devices, comprising:
moving a first object, which is arranged in a predetermined game space, in accordance with an operation performed on the terminal device;
moving second objects in the game space in accordance with operations performed on the controller devices, wherein the number of second objects arranged in the game space is determined based on the number of controller devices and each second object is associated with one of the controller devices;
setting a first virtual camera based on a position of the first object in the game space;
repeatedly setting position and attitude of a second virtual camera based on positions of the second objects so that a plurality of the moving second objects in the game space are included in a visual field range;
displaying, on the first display unit, a first game image representing the game space as seen from the first virtual camera; and
displaying, on a predetermined display device separate from the terminal device, a second game image representing the game space as seen from the second virtual camera, wherein
the second camera setting sets an orientation of the second virtual camera so that an angle of depression of the second virtual camera with respect to a predetermined plane, on which the second objects can be moved in the game space, is greater than that of the first virtual camera.

* * * * *